United States Patent [19]
Church et al.

[11] Patent Number: 6,151,743
[45] Date of Patent: Nov. 28, 2000

[54] STRUCTURAL PANEL FOR BRIDGING BETWEEN SPACED SUPPORTS

[75] Inventors: Kenneth S. Church, St. Andrews; Colin Douglas Stewart, Winnipeg; Terry Pohjoisrinne, Gimli; Mark Wallace, Gimli; Aaron Lutz, Gimli; William Richard Haldane-Wilsone; Emile Fekry Gerges Shehata, both of Winnipeg, all of Canada

[73] Assignees: Faroex Ltd., Gimli; Wardrop Applied Systems Inc., Winnipeg, both of Canada

[21] Appl. No.: 09/435,449

[22] Filed: Nov. 22, 1999

Related U.S. Application Data

[63] Continuation-in-part of application No. 09/178,504, Oct. 26, 1998, abandoned.

[51] Int. Cl.$^7$ .................................................. E01D 19/12
[52] U.S. Cl. .............................. 14/73; 14/74.5; 52/309.1; 52/309.11; 52/783.11; 52/783.17; 52/263; 428/107; 428/112
[58] Field of Search ................................. 14/3, 4, 73, 74, 14/74.5, 77.1; 404/17, 18, 28, 70, 71; 52/309.1, 309.11, 309.6, 309.7, 788.11, 783.17, 783.18, 783.19, 263, 793.1, 796.1; 428/107, 112–119

[56] References Cited

U.S. PATENT DOCUMENTS

| | | | |
|---|---|---|---|
| 1,754,784 | 4/1930 | Borsodi | 428/119 X |
| 3,849,237 | 11/1974 | Zetlin . | |
| 4,229,919 | 10/1980 | Huges | 52/263 |
| 4,615,166 | 10/1986 | Head . | |
| 5,033,147 | 7/1991 | Svensson . | |
| 5,553,430 | 9/1996 | Majnaric et al. . | |
| 5,651,154 | 7/1997 | Ahlskog et al. . | |
| 5,794,402 | 8/1998 | Dumlao et al. . | |
| 5,867,854 | 2/1999 | Matteo et al. . | |
| 6,023,806 | 2/2000 | Dumlao et al. . | |

FOREIGN PATENT DOCUMENTS 6-41917  2/1994  Japan .

OTHER PUBLICATIONS

Paper published at 31$^{st}$ International SAMPE Technical Conference —Oct. 26 to 30, 1999 by Aref et al. (11 pages).
Paper entitled "Fiber–Reinforced Polymeric Bridge Decks" by A. Zureick (7 pages).
Paper entitled "A Survey of Composite Bridges" from Composites Technology Mar./Apr. 2000 (5 pages).

*Primary Examiner*—Richard Chilcot
*Attorney, Agent, or Firm*—Adrian D. Battison; Murray E. Thrift

[57] ABSTRACT

A method for forming a structural panel such as for a bridge deck includes providing a first and a second sheet formed by fibers and settable resin and laminating the sheets with a plurality of parallel side by side connection members. The connection members are formed by filament winding around a core using primarily a large wind angle followed by a final shallow angle of wrap. The connection members are triangular in cross section and each is inverted relative to the next so that the sides are in contact. The connection members are connected together while the resin is uncured so that during lamination they cure together to allow integration of the resin, close matching of the shapes so that the resin at the junction remains thin and intermingling of the filaments. The connection members are dry wound on a core and the resin is applied by infusion. The core carries reinforcing members to tailor strength as required along the length of the member. The panels are arranged side by side to form a bridge deck and are connected edge to edge with suitable center connection at the crown and suitable curbing at the sides.

33 Claims, 16 Drawing Sheets

STRUCTURAL PANEL FOR BRIDGING BETWEEN SPACED SUPPORTS

This application is a continuation in part of application Ser. No. 09/178,504 filed Oct. 26$^{th}$ 1998 now abandoned.

FIELD OF THE INVENTION

This invention relates to a method for forming a structural panel bridging between spaced supports. The panel is particularly but not exclusively intended for use as a bridge deck to span between the beams of the bridge for supporting traffic crossing the bridge. It will be appreciated that the principles disclosed and claimed herein can be used for various different size and strength of structural panel. When used in a horizontal orientation as a bridge deck it can be used for light pedestrian use up to heavy vehicular traffic. The panel can also be used in vertical orientation as a sound or retaining wall. In general, the panel includes a first sheet for receiving forces from a load and a second sheet for engaging one or more supports together with intervening elements which provide, in conjunction with the sheets the necessary strength.

It will be appreciated that the panel referred to herein is primarily designed for use as a bridge deck and therefore will primarily be used in a horizontal orientation with a top surface and a bottom surface. However the use of these terms is for the convenience of the reader and it will be appreciated that they are not intended to limit the invention defined herein to a panel of this type only in this orientation.

BACKGROUND OF THE INVENTION

Significant current attention is being given to the development of bridge decks manufactured from fiber reinforced plastics (FRP). One important incentive for this development is the corrosion of conventional steel reinforced concrete which occurs in the presence of water with any salts particularly road salt which tends to infiltrate traditional reinforced concrete bridge decks. Steel reinforced concrete provides the required strength at minimum cost and therefore a major factor in the reluctance to adopt FRP decks is the increased cost which is necessary using conventional techniques to manufacture a deck having the required equivalent strength.

The FRP decks of course have significant advantages over concrete, related not only to the resistance to corrosion, but also the significantly reduced weight which allows installation which can be carried out much more quickly avoiding the necessity for heavy equipment. Also FRP decks increase the live load capacity of the structure by removing heavy concrete decks The inherent advantages of FRP decks have not yet sufficiently overcome the initial cost disadvantages to allow widespread application but some success is now being achieved leading to considerable attention to further development and life cycle cost analysis.

One important current technique which is widely used is that of pre-forming a plurality of pultruded longitudinal sandwich elements which are laminated at the top and bottom with covering sheets so as to form a structural sandwich construction. The pultruded elements can comprise simple tubular bodies or can be more complex with multi-cellular cross sectional construction. Pultrusion necessarily forms a part of constant cross section, as defined by the pultrusion die, and forms outside and inside surfaces which are necessarily accurately flat. Bonding of the top and bottom surfaces of the pultrusion therefore to the laminating sheets can be effected using conventional adhesive materials since the spaces or interstices between the laminating sheets and the pultruded parts are necessarily relatively small so that the thickness of the adhesive is minimized.

The significant disadvantages of pultrusion are however that:

a) The cross section is necessarily constant and therefore it is not possible to modify or tailor the materials within the cross section along the length of the pultruded part to accommodate the different bending and shear forces along the length of the part and bearing forces caused by the loads applied to the panel.

b) Pultrusion necessarily utilizes mat or fabric to provide transverse strength. While some of the fiber reinforcement in the resin material can be provided by rovings, a significant proportion must be provided by fabric or mat and this carries a significantly higher cost due to the intervening manufacturing process. Very approximately, fabric carries a cost of 3 to 4 times the cost of roving or individual filaments thus dramatically driving up the cost of the finished product.

c) The pre-forming of fabrics while dry prior to entering the pultrusion die necessarily forms small folds in the fabric at the corners of the cross-section and these folds in the finished part form flaws which can lead to failure.

As the end product is highly cost sensitive, due to the competition from conventional concrete, the above disadvantages of the use of fabric and the inability to minimize material use provides the finished product which is only marginally competitive despite the significant advantages outlined above.

An alternative technique for manufacturing composite panels of this type involves the use of hand lay-up processes in which top and bottom plies of fabric are applied onto pre-formed intervening sandwich members of fabric wrapped foams or balsa wood while both the plies and sandwich members remain in dry condition without the addition of the resin material. From the dry condition, the finished part is formed by infusing resin through the fiber materials so as to integrate the fiber materials into a common structure by the common plastic resin passing throughout the structure.

This technique has the advantage that the structure is formed integrally by the infused resin and thus avoids the necessity for adhesives and bonding. However the structure retains the disadvantage that the lay-up process necessarily involves the use of significant quantities of fabric thus leading to the above cost disadvantages.

The hand lay-up process theoretically allows the cross section of the panel to be tailored along the length of the panel to accommodate the changing loads along the length of the panel but in practice this is very difficult to achieve without the addition of labor to cut and apply variable ply layers of fabric to different sections of the panel.

It will be appreciated that bridge decks of this type are used to span spaced support members or beams so as to transfer the loads from the passing traffic (either pedestrian or vehicular) to the underlying beams.

Without going into the calculation of the forces in detail, it will be appreciated that in general the loads applied to the deck at positions on the deck aligned with the longitudinally spaced supports are substantially at right angles to the deck so as to provide a tendency to shear the deck at the bearing support. The maximum shear loads are therefore at the supports.

In between the supports the shear loads decrease. Loads applied to the deck also tend to bend the panel. The bending forces at the midpoint between the support points are generally the compression in the top sheet and the tension in the bottom sheet for simply supported panels. The loads therefore at the support points are entirely different from those at the midpoints between the support points thus leading to different structural requirements at these different locations along the length of the panel.

U.S. Pat. No. 4,615,166 (Head) issued Oct. 7, 1986 discloses a deck panel of this general type including top and bottom sheets formed of steel and an intervening sandwich member which zigzags back and forth between the sheet members. The sandwich member is formed by pultrusion from fiber reinforced resin material and is bonded to the top and bottom sheets. The spaces in between the sheets are then filled with foam. It is not believed that this construction has achieved significant commercial success.

A more recent structure is shown in U.S. Pat. No. 5,794, 402 (Dumiao et al) issued Aug. 18, 1998. This shows a modular bridge construction which preferably incorporates beams formed from FRP which are attached to an overlying deck panel construction.

The deck panels are formed again from top and bottom sheets together with intervening preformed cured tubular members which are arranged side by side along the panel and bonded to the sheets.

Again the tubular members are preferably formed by pultrusion from fiber reinforced resin and in practice the products manufactured by the assignee of this patent (Martin Marietta Materal Inc) have used large fully cured single-cell pultrusions between the top and bottom sheets.

The patent does mention in passing and purely speculatively that the tubular members may be formed by other techniques such as "hand lay-up or other suitable methods including resin transfer molding (RTM), vacuum curing and filament winding, automated lay-up methods and other methods known to one of skill in the art of composition fabrication". However it is believed that these techniques have not been used in practice and no detail is provided as to how these techniques might be employed. In addition the patent describes first the complete forming of the tubes indicating that the method uses a cured structural member.

As set forth above the pultrusion method for the formation of the intervening members between the two sheets necessarily includes the use of expensive fabric thus significantly increasing the cost of the finished product.

Another process is described in a paper published at the $31^{st}$ International SAMPE Technical Conference Oct. $26^{th}$ to $30^{th}$ 1999 by Aref et al and discloses a technique in which cured filament wound cores of oval shape are arranged side by side and wrapped by a further layer of filament winding. The structure is then infused with resin and the resin cured. However this proposal again uses cured cores so that the bonding of each to the next is limited by the strength of the resin bond and there is no filament intermingling. The use of oval cores in any event provides little contacting surface area.

SUMMARY OF THE INVENTION

It is one object of the present invention, therefore, to provide an improved method of manufacturing of structural panel of this type which is preferably but not exclusively designed for use on a bridge deck allowing the use of reduced cost roving as the main structural component.

Generally according to a first aspect of the invention, therefore, there is provided a method for forming a structural panel for bridging between longitudinally spaced supports comprising:

collating a structure comprising:

a first sheet of fibers;

a second sheet of fibers generally parallel to and spaced from the first sheet;

and a plurality of intervening connecting members for arrangement between and connection to the first and second sheets, the connecting members being parallel, side by side and extending longitudinally of the panel;

wherein each connecting member is formed from an outer tubular layer defined by a series of helically wrapped filaments wrapped around a core member;

and wherein an unset resin in the filaments of the connecting members is cause to set while the connecting members are in intimate contact each with the next causing the resin and filaments of each connecting member to intermingle with those of the next adjacent member while the resin sets such that the connecting member and the next adjacent connecting member are intimately bonded together by the resin of one being set with the resin of the next and filaments of one being intermingled with filaments of the next.

Thus in order to provide a particularly effective bond, the connecting member and the next adjacent connecting member are intimately bonded together by the resin of one being set with the resin of the other. This is achieved by mating the parts while the resin remains wet or un-set so that the resin of one body as it sets becomes integral with that of the next adjacent body. This technique also overcomes the inherent roughness of cured filament wound structures since the bodies are pressed together as the resin sets. The fibers of one also tend to mingle or interconnect with those of the next due to the pressure between the elements as the part is assembled and the resin sets.

The connecting members can be collated with pre-formed and pre-set sheets and attached thereto by the setting of the resin. However as a preferred technique, the sheets are in an un-set condition. This can be achieved by applying the sheets while still uncured or wet or by supplying the sheets in dry condition when assembled and the resin infused through the whole structure for setting simultaneously.

The connecting members can also be formed with resin applied by the filaments. However as a preferred technique, the connecting members are formed dry, assembled into position and the resin drawn into the assembled construction by infusion so that the connecting member and the next adjacent connecting member are intimately bonded together by a common resin material impregnated into the filaments of both.

Where this specification refers to "setting" of a resin material, this is intended to refer to a resin material which is initially in a liquid condition and becomes more viscous or solid over time as it "sets". In most cases, the resin will be thermosetting since these resins provide improved performance. However other resins which set due to a chemical reaction or are thermoplastic can also be used in some cases and such resins are now becoming more available.

Intermingling of the filaments is obtained by the filaments of one member being immediately adjacent those of the next member so that some filaments from one become interspersed into the interstices between those of the next. The filaments are primarily continuous so that there are no free ends but because there are interstices and spaces between the filaments and because they can move to some extent under pressure, they work their way between one another to increase the amount of contact. Thus instead of merely touching at a tangent in a common plane of the outermost filaments, the filaments of one member engage into the outermost plane of the next member to provide an increased length of contact. Forces between filaments are primarily communicated through the resin so that an increased area of contact significantly increases the bonding forces between each member and the next.

The filament wound members of the present invention allow the use of the materials at lest expensive cost since the materials do not require any expensive further processing to form fabrics and the like and instead are used in their raw form. The conventional disadvantage of filament winding is that the outside surface is notoriously rough in its cure state. This requires sanding or working to obtain the necessary surface structure to obtain good bonding effect. The present invention overcomes this problem by bringing the filament wound members together in a dry or wet state so that the filaments can intermingle as set for the above and the resin sets as a common or integral structure.

Preferably the tubular layer is formed wholly from uni-directional rovings without any fabric. In some cases however, the filament winding rovings can be supplemented by fabric strip.

It is necessary as set forth above that the connecting members be brought together while the resin is in an un-set condition, this can be achieved by winding the filaments while carrying the necessary resin in un-set condition following which the structure is assembled while still wet. However it is preferred that the filaments of each connecting member are wound while dry of the resin and wherein the resin is applied to the connecting members by infusion.

The filaments of each connecting member are wound onto a core and in order to allow transfer for resin during infusion preferably the core has at least one longitudinal channel therein to allow the resin to run along the channel.

Preferably each connecting member is formed during a main part of the winding by winding filaments in at an angle to the axis of the core. However in a final step of winding, the filaments are preferably wound at an angle substantially at right angles to the axis so that the filaments of one connecting member are substantially parallel to those of the next when the connecting members are placed side by side. This arrangement allows increased intermingling of the filaments since the filaments are parallel at the interconnection so that each can engage more easily into the interstices between two of the filaments of the other member. Also the final wrapping of a layer of filaments at an angle close to a right angle to the axis acts to consolidate the filaments wrapped previously to expel trapped air and to remove resin rich areas. A similar shallow angle wrap can also be applied at the start of the process. During the main part of the winding, the angle can be varied to achieve different angles of filament in the final structure, but the angle preferably remains constant along the length of the structure to avoid sections of different thickness.

Preferably the first and second sheets are added to the structure either while the resin therein is un-set or while dry and the resin infused through the whole structure simultaneously. Thus un-set resin in the filaments of the first and second sheets is cause to set while the connecting members are in intimate contact therewith.

Preferably the first and second sheets are formed by filament winding either by filament winding around the connecting members when collated into a stack or by winding the filaments around a mandrel and cutting the wound structure into separate sheet elements to be applied individually to the top and bottom of the collated stack of connecting members.

Preferably each of the connecting members comprises a polygon in cross section arranged such that at least one flat surface of each polygonal connecting member engages a flat surface of the next adjacent. This maximizes the area of contact between the connecting members and thus provides maximum intermingling of the filaments as the parts are set together.

Preferably each polygonal connecting member has the apexes thereof rounded and wherein there is provided a rigid elongate insert member between the apex of one connecting member and an adjacent portion of the next to fill the space therebetween formed by the rounded apex.

Preferably the insert member is formed by pultrusion from fiber reinforced resin material.

In the simplest structure of the connecting members, the thickness of the wall is maintained constant along the length of the connecting member by using winding angles which do not vary along the length of the connecting member but can vary through the thickness of the wall.

In some arrangements, the core can be formed of foam or the like so that it remains in place in the finished construction or can be dissolved out where required to form a hollow construction. The foam core can be supplemented by a surrounding stiffener of a fiber reinforced resin material to allow the core to accept the relatively high pressures of filament winding.

In an alternative arrangement, the core can be hollow but formed of a tube which remains in place after the construction is complete.

In a yet further arrangement, the winding can be effected on a removable mandrel which is then used as a stiffener member during subsequent molding of the structure and particularly during the resin infusion process, and finally removed after the construction is complete. Such mandrels can be formed of steel or other suitable rigid material which has sufficient strength to accommodate the winding forces. The mandrel is defined by closed walls defining a hollow interior and is removed after the resin is set by applying a vacuum to the hollow interior of the core so as to flex the walls inwardly so as reduce exterior dimensions of the walls sufficiently to allow removal of the core by pulling the core longitudinally of the connecting member.

When using such a rigid core, the connecting members can be inserted into a closed mold and the resin is infused into the connecting members by injecting the resin into the mold under pressure.

Where a central sacrificial core is used which remains in place after molding, one or more of the following techniques can be used to maximize or increase the strength of the connecting member at required positions along its length, thus reducing the total quantity of filaments used and thus minimizing or decreasing the weight of the total structure Preferably, in order to maximize the efficiency of use of the filaments, each connecting member has a thickness of the outer tubular layer defined by the helically wrapped filaments which varies along the length of the connecting member so that the tubular layer has an inner surface which varies in spacing from a central axis of the connecting member in a direction along the length of the connecting member such that the cooperating flat surface portions are flat along the length of the connecting member.

Preferably each connecting member has a thickness of the outer tubular layer defined by the helically wrapped filaments which varies along the length of the connecting member and wherein the tubular layer has an inner surface which varies in spacing from a central axis of the connecting member in a direction along the length of the connecting member such that cooperating flat surface portions thereof are flat along the length of the connecting member.

Preferably the thickness of the outer tubular layer is varied by variations in the wind angle of the helically wound filaments.

Preferably the wind angle is reduced at the supports and increased at positions midway between the supports.

Preferably each connecting member includes a core having an outer surface contacting the inner surface of the tubular layer, the outer surface of the core having a shape which is varied along the length of the core so as accommodate the variation in the thickness of the tubular layer.

Preferably the tubular layer of each connecting member includes a plate of filament reinforced resin material wrapped on the outside by the helically wound filaments.

Preferably the plate of filament reinforced resin material is located adjacent the midpoint between supports.

Preferably the plate of filament reinforced resin material reduces in width either side of the midpoint.

Preferably each connecting member includes a core having an outer surface contacting the inner surface of the tubular layer, the outer surface of the core having a shape recessed along the length of the core so as accommodate the thickness of the plate.

Preferably the tubular layer of each connecting member has at least one flange projecting inwardly.

Preferably the flange is formed by filaments wound spirally at a predetermined location along the connecting member.

Preferably the flange is arranged adjacent a respective one of the supports.

Preferably each connecting member includes a core having an outer surface contacting the inner surface of the tubular layer, the outer surface of the core having a shape recessed at the flange so as accommodate the depth of the flange.

The panel is preferably used in a bridge deck construction and can be arranged such that the connecting members are open at least at one end thereof and wherein the method includes attaching an end structure to the end of the end of the panel by casting the end structure and inserting a portion of casting material therefor into the end of the connecting members for connection of the end structure to the panel.

Preferably where the panel comprises a bridge deck the end structure comprises a barricade defining a side wall of a roadway formed on the bridge deck.

Preferably where the panel comprises one half of a bridge deck for connection end to end at a center line of the bridge deck with a similar panel forming a second half the end structure comprises a connector for interconnecting the two halves.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
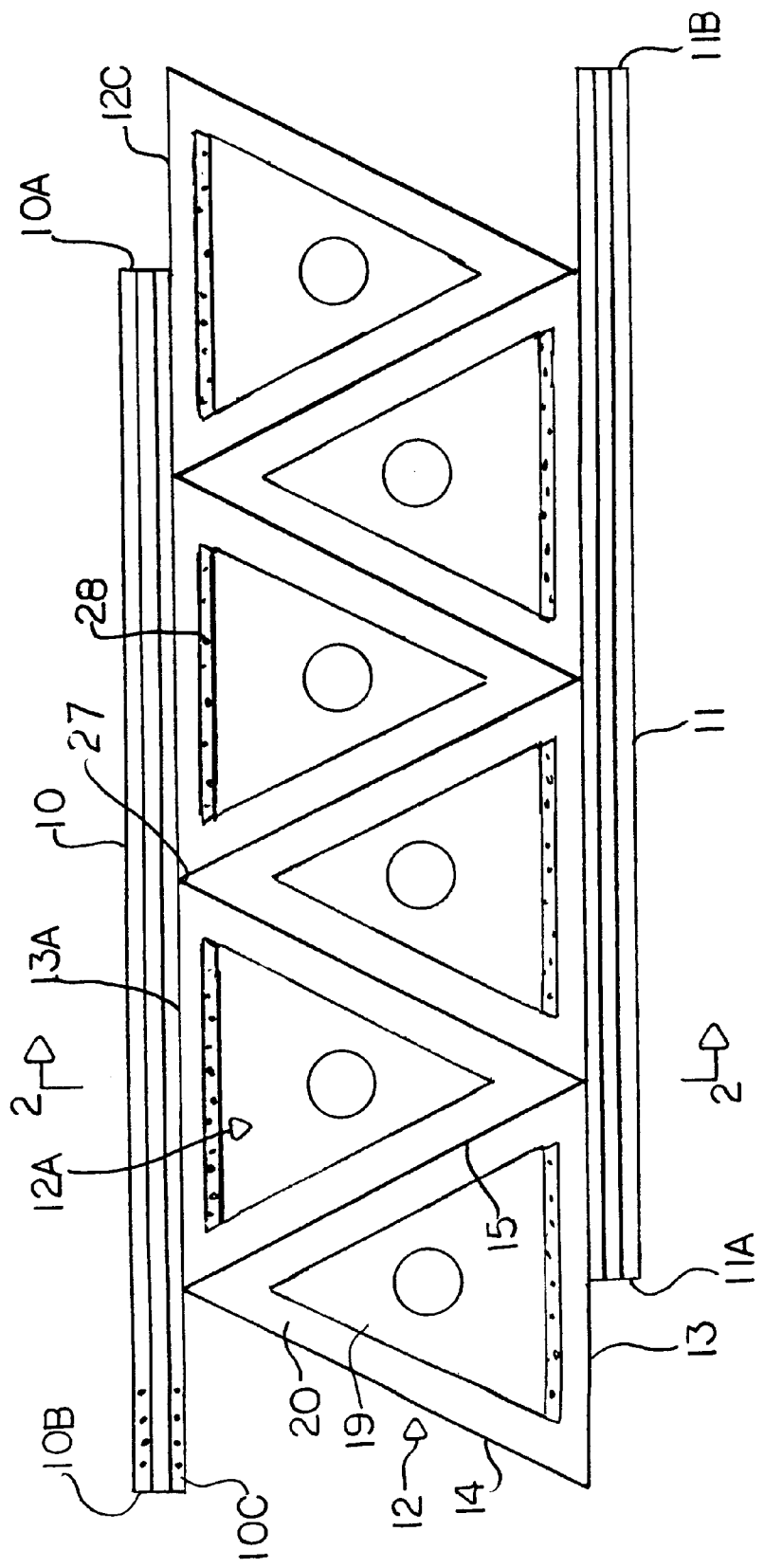
FIG. 1 is an end elevational view of a single deck panel according to the present invention arranged for connection to next adjacent panels for forming a bridge deck.
Figure 2:
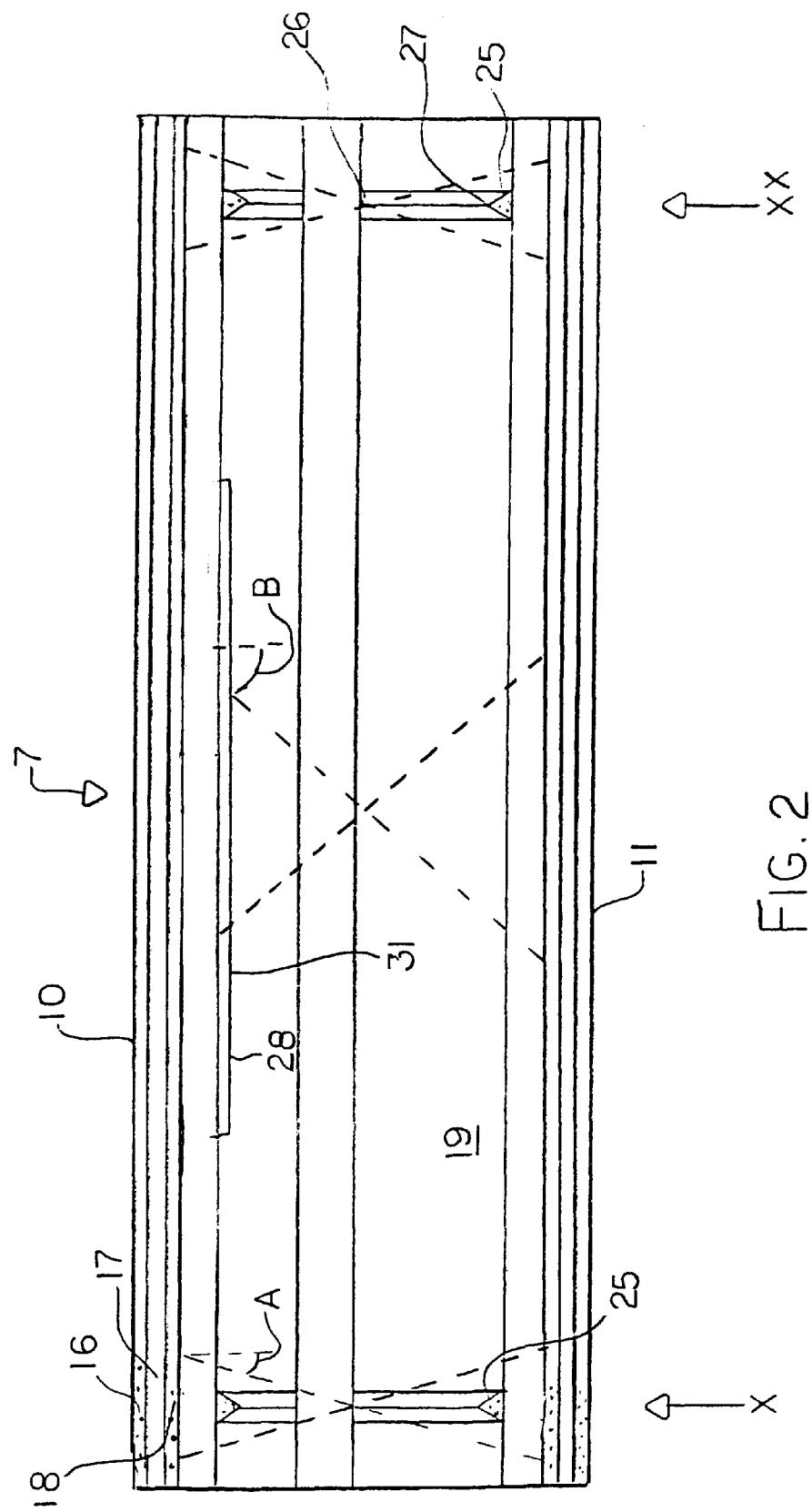
FIG. 2 is a cross sectional view along the lines 2—2 of FIG. 1.
Figure 3:
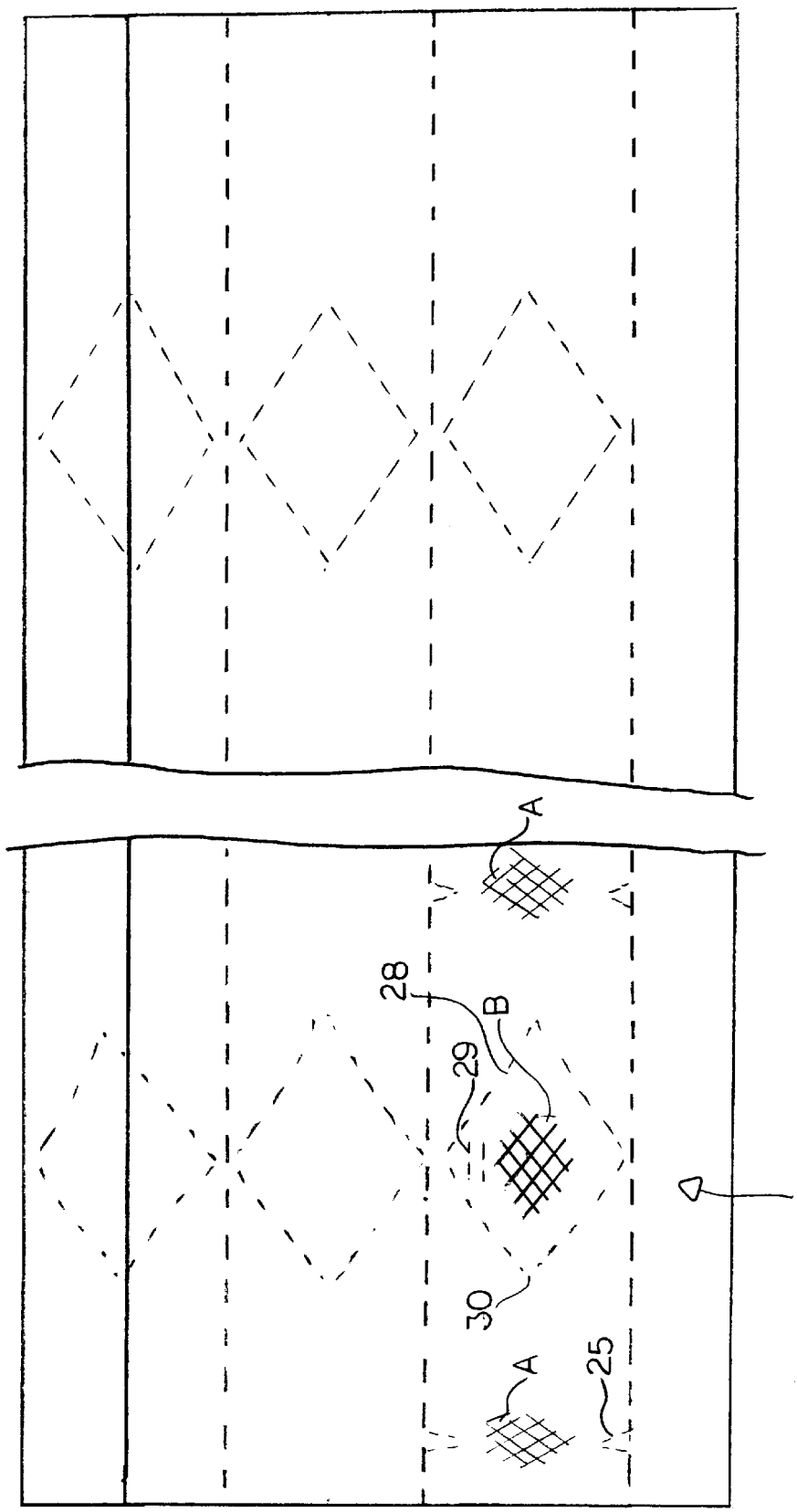
FIG. 3 is a top plan view of one part only of the panel of FIG. 1.

A panel for use in forming a bridge deck is shown in FIGS. 1, 2 and 3. A single panel is shown in cross section in FIG. 1 and it will be appreciated that the panel is designed at side edges of the panel so that each panel can be joined to a next adjacent panel by suitable overlapping or butting sections thus connecting the individual panels into a deck defined by a plurality of the panels arranged edge to edge.

The panels are designed so as to be supported at spaced positions along the length of the panel with the length being illustrated in FIG. 2. In FIG. 2 two supporting positions are indicated at X and XX so that the panel illustrated is intended to be supported only at two extreme positions. However in other examples the panel may be supported at a plurality of positions along its length so that the positions X and XX represent only two of a series of positions along the continuous length of the panel.

It is intended that in most cases the length of the panel will be arranged transversely to the length of the deck so that the panel has a length defining the width of the deck and the panels are arranged edge to edge to define the length of the deck.

In many cases the support points X and XX will be defined by supporting beams of the bridge which span the space to be bridged. Thus in a simple bridge structure, there may be only two spanning beams supporting a relatively narrow panel structure. In other cases there may be a series of spanning beams arranged parallel and across the space to be spanned so that each panel is supported by a plurality of the beams.

The type and structure of the beams is not described herein as it does not form the subject matter of the present invention. Various arrangements for structural beams including but not limited to steel, concrete beams and FRP beams are well known to one skilled in the art.

Each panel comprises a structure formed from an upper sheet 10, a bottom sheet 11 and a plurality of connecting members 12.

In the embodiment shown the connecting members are triangular in cross section so as to define a flat surface 13 and two flat side surfaces 14 and 15. Alternate ones of the connecting members as indicated at 12A are inverted relative to the others so that the triangular cross sections intermesh. Thus the flat base surface 13 of the first interconnecting member 12 is attached to the bottom sheet 11 and the flat base surface 13A of the second interconnecting member 12A is attached to the top sheet 10.

In the embodiment shown there are six such interconnecting members defining a particular width of the panel but it will be appreciated that this number can be increased or decreased in accordance with design requirements so as to provide a panel of a preferred width. The interconnecting members can also include other shapes. It is important that the shapes of interconnecting members be selected so that each abuts the next in a flat surface with the flat surface having sufficient width to provide structural connection between the connecting members sufficient to transfer the forces therebetween. In the example shown using the triangular shape, the flat faces of the connecting members span the full space between the top and bottom sheets so as to provide the maximum area of interconnection between the one connecting member and the next. However other shapes may be selected which reduce the width of the flat contacting surfaces.

In an alternative embodiment, the connecting members may also be rectangular so that the contacting surfaces again span the full space between the top and bottom sheets but in this embodiment the contacting surfaces lie at right angles to the sheets.

Figure 6:
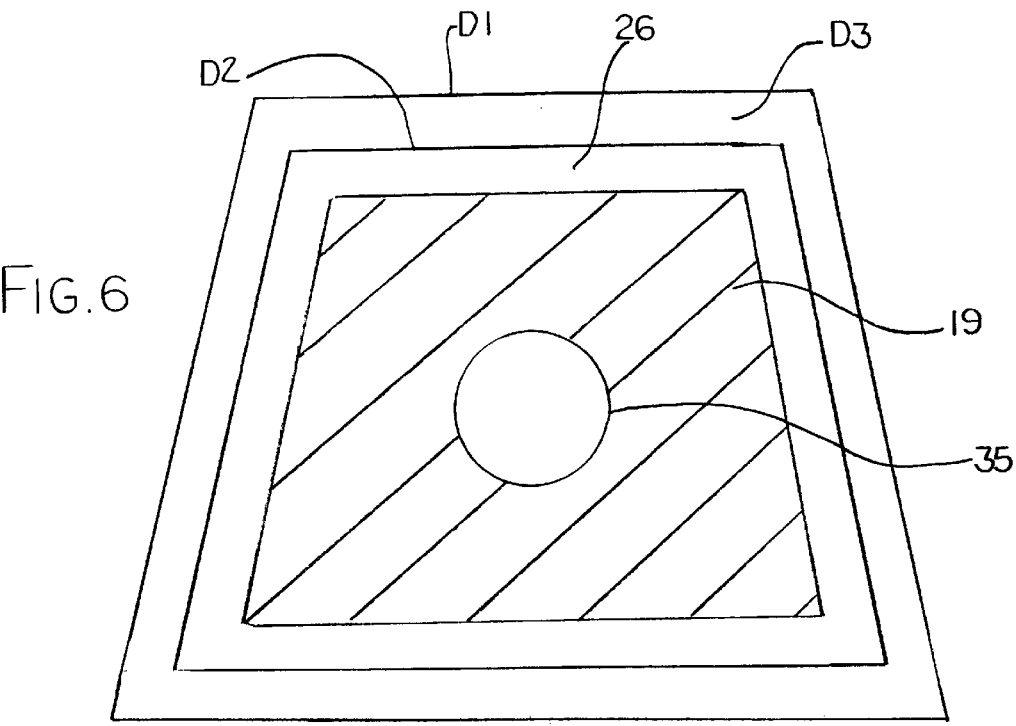
FIG. 6 is cross sectional view along the lines 6—6 of FIG. 5.
Figure 7:
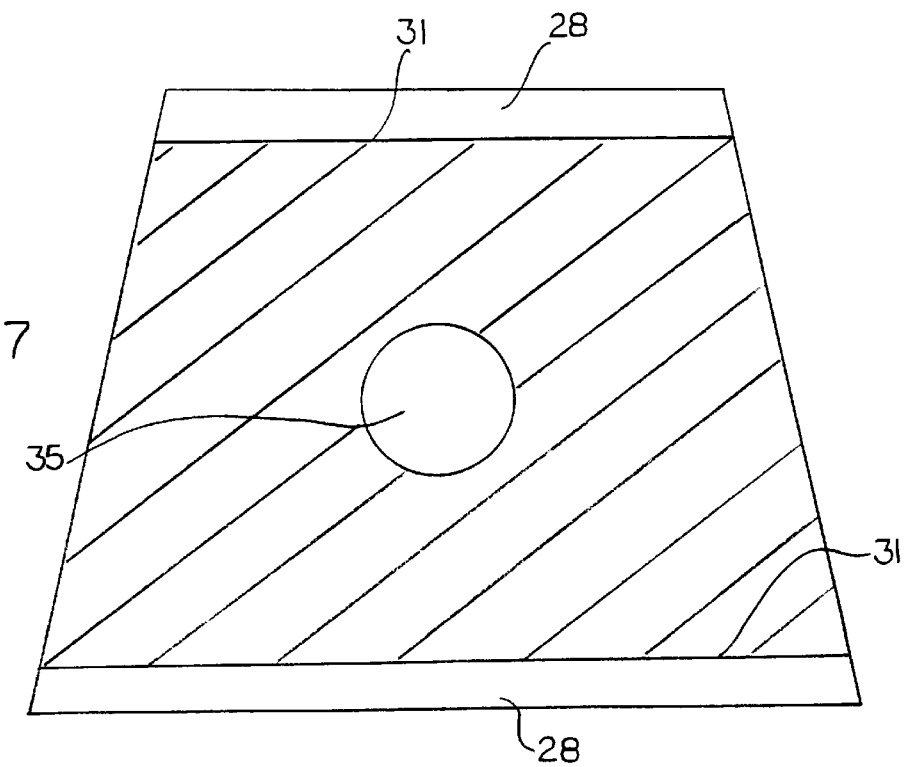
FIG. 7 is cross sectional view along the lines 7—7 of FIG. 5.

In another embodiment, the connecting members can be of a trapezium shape with a flat top, flat bottom and two sides at least one of which is inclined to the top and bottom sheets. Such an arrangement shown for example in FIG. 6 and 7 again requires that one connecting member is inverted relative to the next.

The connecting members need not be identical, while this is preferred for convenience of manufacture.

The connecting members are preferably polygonal so that the flat sides meet at apexes and each flat side is bonded to a surface of either one of the sheets or a next adjacent connecting member. However again this is not essential and in between the flat contacting surfaces, other shapes may be adopted.

In the embodiment shown, each of the top and bottom sheets is formed as a laminate which has for example three separate layers indicated individually at 16, 17 and 18. It will be appreciated that the number of layers is purely exemplary and the number of layers can be varied in accordance with structural requirements. The sheets can also be formed from a single layer as described in more detail hereinafter.

In this embodiment, the sheets 10 and 11 are formed layers of fiber reinforced plastics material which is preformed and set. However as described hereinafter, the sheets can be dry of carrying uncured resin.

Each layer comprises a layer of resin in which is embedded filaments which are laid parallel in a common direction along the length of the layer. The structure of the preferred embodiment thus avoids the use of bi-directional fabrics and uses wholly inexpensive continuous filaments supplied from conventional roving bobbins and laid side by side. Each layer can thus be formed by a pultrusion method in which the rovings are pulled through a slot shaped dye so as to carry the resin through the dye and to be set in the dye to form a flat strip or sheet. The layers are then laid each on top of the next to form a laminate bonded together either by an intervening adhesive or by allowing the resin of the individual layers to completely set after the layers have been joined and held in an assembled laminated condition. The layers can be sanded so as to improve adhesion to the intervening elements of the construction since sanding can expose fibers to allow them to bond with the fibers and resin of other structures.

As schematically illustrated in FIGS. 1 and 2, the fibers or filaments of the top layer 16 and the bottom layer 17 of the sheet 10 are arranged along the length of the panel whereas the filaments of the layer 17 are arranged at right angles to that length. This provides a laminated sheet 10 having structural strength in both directions. The number of layers in the laminate can be varied in accordance with the requirements. Some of the sheets may be added with fibers extending at an angle inclined to the length or inclined to a direction at right angles to the length to provide yet additional transverse strength.

In this embodiment, the sheets 10 and 11 formed from the laminated layers are pre-formed and pre-set prior to assembly and to the structure defining the complete panel. Alternatively, however, the sheets may be formed so that the resin is not completely set, as discussed in more detail hereinafter or may be formed in dry condition and the resin drawn through the whole structure of the panel by a resin infusion system again as discussed here in more detail hereinafter.

The connecting members 12 are formed by filament winding onto a core 19 to form an outer tubular layer 20. The filament winding and the core are arranged so that the tubular layer 20 has a flat outer surface allowing the surface to be bonded intimately by the resin or by a separate adhesive to the next adjacent connecting member and to the sheets.

The tubular layer is therefore formed substantially wholly by filament winding that is using continuous or essentially continuous rovings which are wrapped spirally or helically around the core without the use of any significant quantities of mat or fabric for transverse strength.

The core 19 is formed preferably from a suitable material which can be left in place as a sacrificial core. Suitable materials include rigid foam and light wood. Such materials can be readily shaped to provide the required outside surface as discussed in more detail hereinafter and are sufficiently inexpensive to remain in place to avoid the difficulty of extraction and to provide additional strength. The sacrificial core also has the advantage that modifications for design changes can be readily made. However removable cores can also be used which are specifically designed so to provide the required outside shape as discussed hereinafter and so as to allow some degree of collapsibility so that the core can be retracted away from the inside surface of the formed tubular layer and withdrawn axially from the connecting member. When formed of foam, the core can be readily removed in areas where required by dissolving the foam in a suitable solvent.

If required for a particular design of panel to minimize weight, the filament winding forming the tubular layer can be arranged so as to tailor or maximize the usage of the fibers to provide the strength of the part as required. Thus as discussed previously, the connecting members may require different strength characteristics at different positions along their length depending upon the location of the supports on which the finished deck panel is located. Preferably this tailoring of the usage of the fibers is carried out without the use of fabric thus utilizing only continuous rovings or filaments. However in some cases additional fabric can be employed to provide specific limited fiber content where individually required. A number of techniques are utilized to tailor the location and usage of the fibers along the length of the connecting members.

Thus firstly, the fibers can be laid at different wind angles at different positions along the length of the member. As shown in FIG. 2, schematically indicated in dash line, the wind angle A at the support X is less than the wind angle B at a position generally indicated at Z between the supports X and Y. The wind angle at the support Y is again reduced to the angle A so that the structure is substantially symmetrical at the support positions X and Y together with any further support positions and again symmetrical at positions intermediate the support positions at indicated at position Z.

In a second technique for modifying the fiber content and position within the member, a plurality of flanges 25 are formed on the inside surface of the tubular layer projecting inwardly into a corresponding recess in the core 19. The flanges 25 each lie, as shown, in a respective plane at right angles to the axis of the member. Each flange is formed by spirally winding filaments at the recess 26 until the recess is filled. When each recess in turn is filled by the spirally wound filaments the helical winding of the tubular layer can be commenced at the required wind angles to complete the formation of the tubular layer on top or outside of the respective flanges.

As shown the flanges are preferably triangular in cross section converging inwardly to an apex 27. However the flanges can be square or trapezoidal in cross section with a flat inner edge so as to be generally disc shaped surrounding the axis of the member.

In addition, the flanges can have a helical shape so that they wrap helically around the core. The helical recesses are however filled prior to the helical winding of the remainder of the tubular layer which is wound at an angle different from the helix of the recesses.

The flanges thus defined by filling the recesses provide additional structural strength to resist compression of the member in a direction at right angles to the axis.

Primarily the flanges are required at the support positions X and Y and no flanges or fewer flanges are required at the intermediate positions Z. In FIG. 2, therefore, there is shown a single flange at each support position and no flanges in between the support positions. In other alternative arrangements the number of flanges can be increased so that there are more flanges at the positions X and Y and reduce numbers intermediately at the positions Z. Thus the spacing between the flanges will increase in the area of the position Z.

The third technique for tailoring the location of the fibers includes a provision of an additional, separately formed, sheet or pre-formed layer 28 on the core 19 inside the tubular layer. The fibers 29 of the layer 28 are arranged parallel to the axis of the member so as to provide an increase in strength in the longitudinal direction for both compression and tension loads.

As these loads are at a maximum at the position Z intermediate the support points, the additional layer 28 is preferably located at the position Z. As illustrated, the layer has a maximum width at the position Z and has a width which reduces along the length of the member down to an apex 30 at each end of the layer. The layer as shown is thus diamond shape and is shaped to provide the additional strength required primarily at the position Z and tapering in either size of the position Z as the requirement for additional strength tapers.

The layer 28 is formed by cutting the required shape from a pultruded layer similar to or identical to the layers 16, 17 and 18 forming the upper and lower sheets. Thus the layer 28 is wholly formed from continuous longitudinal fibers or filaments without the necessity or addition of fabric.

The layer 28 is received within a recess 31 in the core which has a shape corresponding to the layer so that the layer is recessed inwardly into the core and forms an additional layer on the inside surface of the tubular layer.

These flanges 25 necessarily are formed on each of the walls of the tubular member. However the layers can be applied on only one or more of the walls of the member. Thus in the embodiment as shown the layers 28 are applied only on the base wall of the member and there are no corresponding layers in the side walls. Thus the increase in structural strength is provided at the top and bottom sheets to accommodate the compression and tension loads.

It will be appreciated that a tubular member formed from filament winding having a constant wind angle and constant wall thickness will provide constant structural strength along the length of the member. It will be further appreciated that the loads in the bridge deck vary depending upon the position of the supports. The member must of course provide sufficient structural strength at each position to accommodate the loads applied to the member. Suitable calculations can therefore be carried out, within the skill of one in this art, to determine the variation in loads along the length of the member and therefore the increase in structural strength which is required to accommodate those loads. The above arrangements provide suitable techniques therefore for adding to the structural strength of a basic filament wound tube at the specific locations required. The amount of the structural strength which is required to be added can be calculated and the necessary modifications made to the member to provide the required structural strength.

One technique for interconnection of each panel to the next is shown in FIG. 1. In this arrangement the top sheet 10 is recessed at one end 10A to leave an upper portion of the end connecting member exposed as indicated at 12C. At the other end 10B of the sheet 10, an end portion overhangs the top apex of the end connecting member. The bottom sheet 11 is arranged symmetrically so that one end 11A is recessed and the other end 11B is exposed. It will be appreciated therefore that a symmetrical panel can be connected to each end of the panel as shown by inverting the next adjacent panel. A suitable adhesive can be applied on top of the end surface 12C, and underneath the projecting portion 10B on the surface 10C. This connection therefore provides both mechanical and adhesive connection of each panel to the next. In alternative embodiments the connection can be provided by using tongue and groove type connections or by providing an additional key piece which is inserted between two panels and connect one panel to the next. Connection can also be provided by simple butt joint although this is not preferred. Suitable designs for connection can be generated by a person skilled in the art depending upon the shape of the connecting members which is selected for the particular design.

Turning now to FIGS. 4, 5, 6 and 7, there is shown schematically further details of the method for forming the individual connecting members prior to assembly into the panel structure described previously. The method as shown utilizes the conventional filament winding process well known to one skilled in the art.

The core 19 is mounted on a support shaft 35 carried on suitable supports schematically indicated at 36 and arranged for driving rotation of the shaft about its axis by a drive system schematically indicated at 37. Adjacent the shaft is provided a filament dispensing system 38 carried on a track 39 and driven along the track by a drive system schematically indicated at 40. The dispensing system 38 carries a plurality of filament bobbins 41 which release rovings 42 for dispensing through a guide head 43. Various arrangements known to one skilled in the art can be used to provide the above relative movements.

In general, the rotation of the shaft 35 and the movement of the dispensing head 38 can be computer controlled so as to provide a specifically designed wind of the filament around the shaft and the core 19 on the shaft. The wind angle of the filament on the core is determined by the rate of linear movement of the dispensing head 38 along the guide track 39 relative to the rate of rotation of the core. The wind angle can be varied from a zero angle in which the filaments are wound in effect wholly spirally where the amount of traverse is only equal to the width of the strip applied, through a relatively shallow angle of the order of 10° up to a maximum angle of the order of 85°. In general, the winding action is effected continuously along the length of the core so that the whole length of the tubular layer wound on the core is partly formed before any individual part of the tubular layer is completed.

Figure 4:
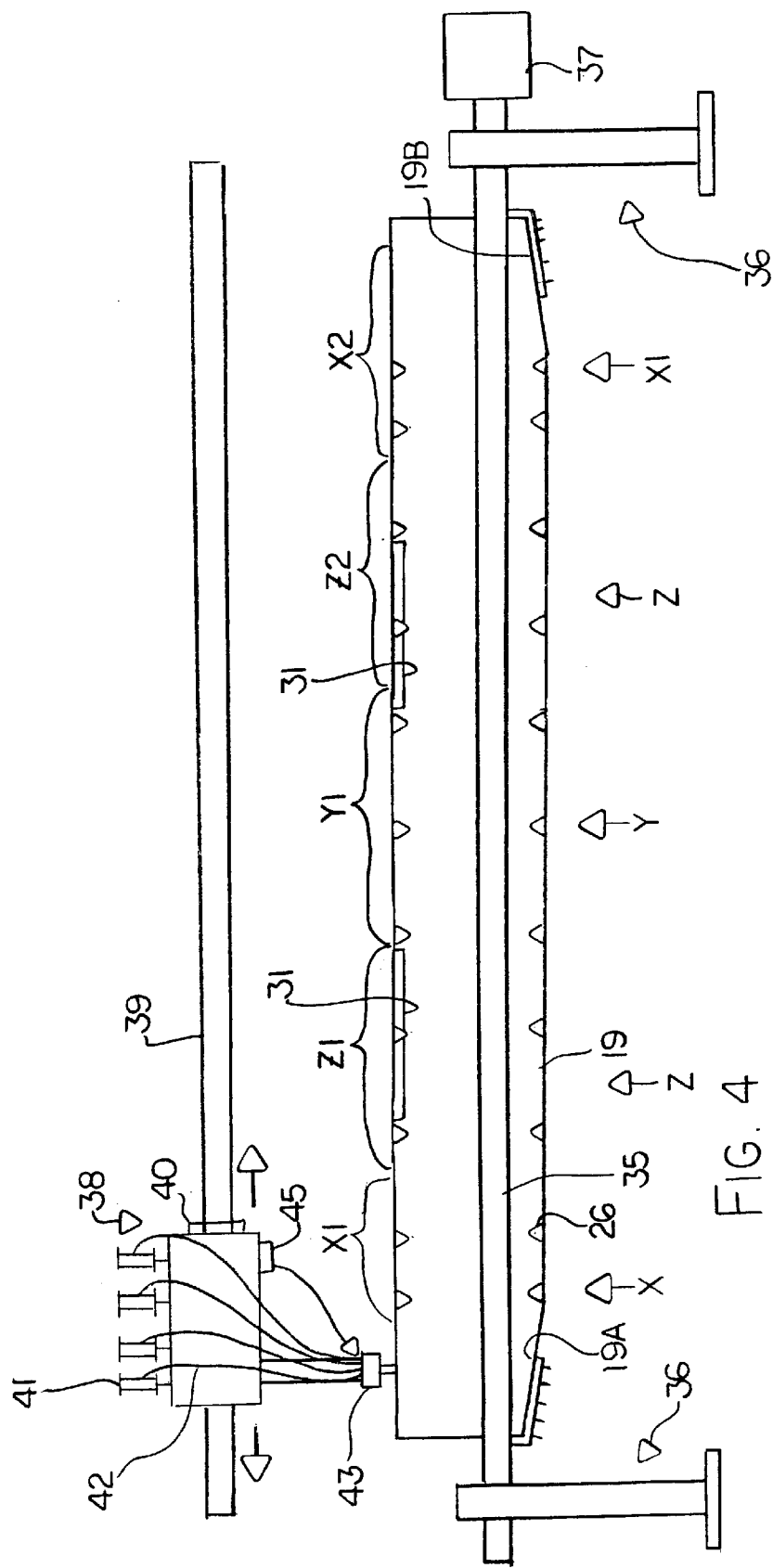
FIG. 4 is a side elevational view of a filament winding apparatus for use in forming the tubular elements of the panel of FIG. 1.

It will be noted in FIG. 4 that the core selected is designed for receiving support at three positions indicated at X, Y and X1 so as to provide two intermediate positions Z. Furthermore the core includes a plurality of recesses 26 at spaced positions along the length of the core. As previously described there are more recesses adjacent the points X, Y and X1 than there are recesses at the points Z. As previously described, the points Z include recesses 31 for receiving the layers 28.

Figure 5:
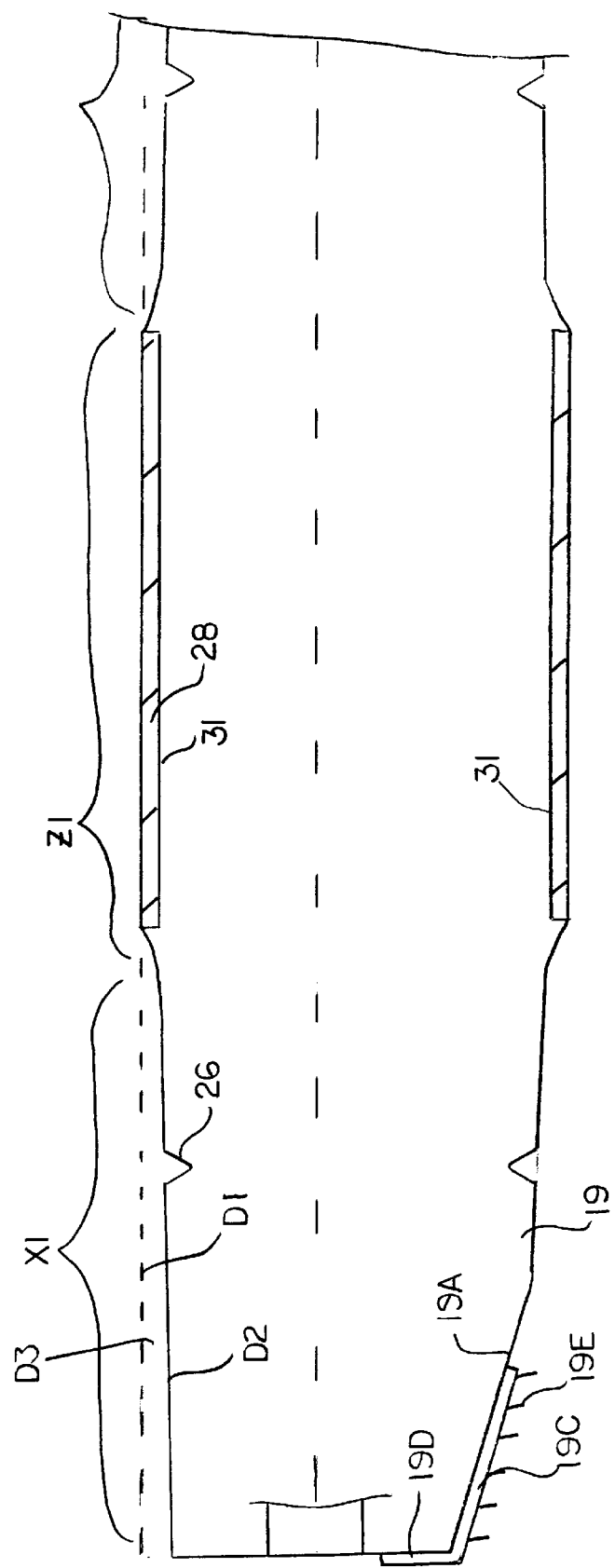
FIG. 5 is a longitudinal cross sectional view of a core for use in the filament winding method of FIG. 4 prior to winding of the filaments.

As best shown in FIG. 5, the core is thus sculpted to provide the recesses 26 and to provide the recesses 31. In addition the core is sculpted so that its transverse dimensions at the zones X1, Y1 and X2 are reduced relative to its transverse dimensions at the zones Z1 and Z2. Thus the core is reduced by sculpting so that its outside surface is cut down at the areas where the tubular layer is thicker due to the reduced angle A of winding of the filaments. It will be appreciated that the thickness of a tubular layer at the areas adjacent the support points where the wind angle is reduced will be significantly thicker than the areas where the wind angle is increased since more filaments are laid at these locations.

The outside dimension of the core at the layer 28 is indicated in dash line D1 and the sculpted reduced dimension at the zone X1 is indicated at D2. This provides a difference in thickness indicated at D3 which accommodates the difference in the amount of filaments laid down at the shallow wind angle.

The sculpting of the core is calculated in dependence upon the selected winding angles and layout of the filaments so that all changes in the thickness of the tubular layer are accommodated in the reduction of the outside surface of the core. In this way the outside surface of the tubular layer is exactly flat or planar along the length of the connecting member without ribs or wider section projecting outwardly from the outside surface at the flanges, at the areas of reduced wind angle or at the layers.

This careful calculation of the wind structure and the core dimensions provides the flat outside surface of the connecting members so that each connecting member has a flat surface for lying in contact with the flat surface of the next adjacent connecting member.

In the embodiment of FIGS. 4 through 7, the connecting members are not triangular but are instead trapezoidal with a flat top and a flat bottom. In this embodiment, therefore, there is provided a recess 31 for the corresponding layer 28 in both the top and the bottom.

As shown in FIGS. 4 and 5, at the ends of the core is provided a tapered section 19A and 19B which is recessed upwardly and outwardly to the end so as to provide a portion which is raised above the bottom surface of the core. In this area on the surface 19A, 19B is applied a mechanical gripper 19C with an end flange 19D attached to the end of the core and a flat plate attached onto the respective surface 19A, 19B. On the flat plate is provided a plurality of upstanding teeth 19E which act to grip end turns of the filaments as the winding turns at the ends of the core. Thus it will be appreciated that the winding is continuous along the length of the core and only reverses at the ends of the core. At the points of reversal there is a tendency for the filaments to slip back along the core toward the other end and so the filaments must be gripped by the teeth 19E to prevent this slipping. The filaments are then held so that the remainder of the winding of the filament can be completed in a stable condition with tension on the filament holding it in place. The gripper plates are maintained in place as an integral part of the structure. The sculpting of the other surfaces of the core adjacent the recessed portion 19A, 19B is calculated so as to accommodate the increased amount of filament wound in this area.

In an alternative arrangement for effecting reversals, a domed core section can be provided at each end where the filaments wrap around the domed section bas they reverse in direction along the core. The domed section of the wound structure when winding is complete is then cut off and discarded.

Figure 8:
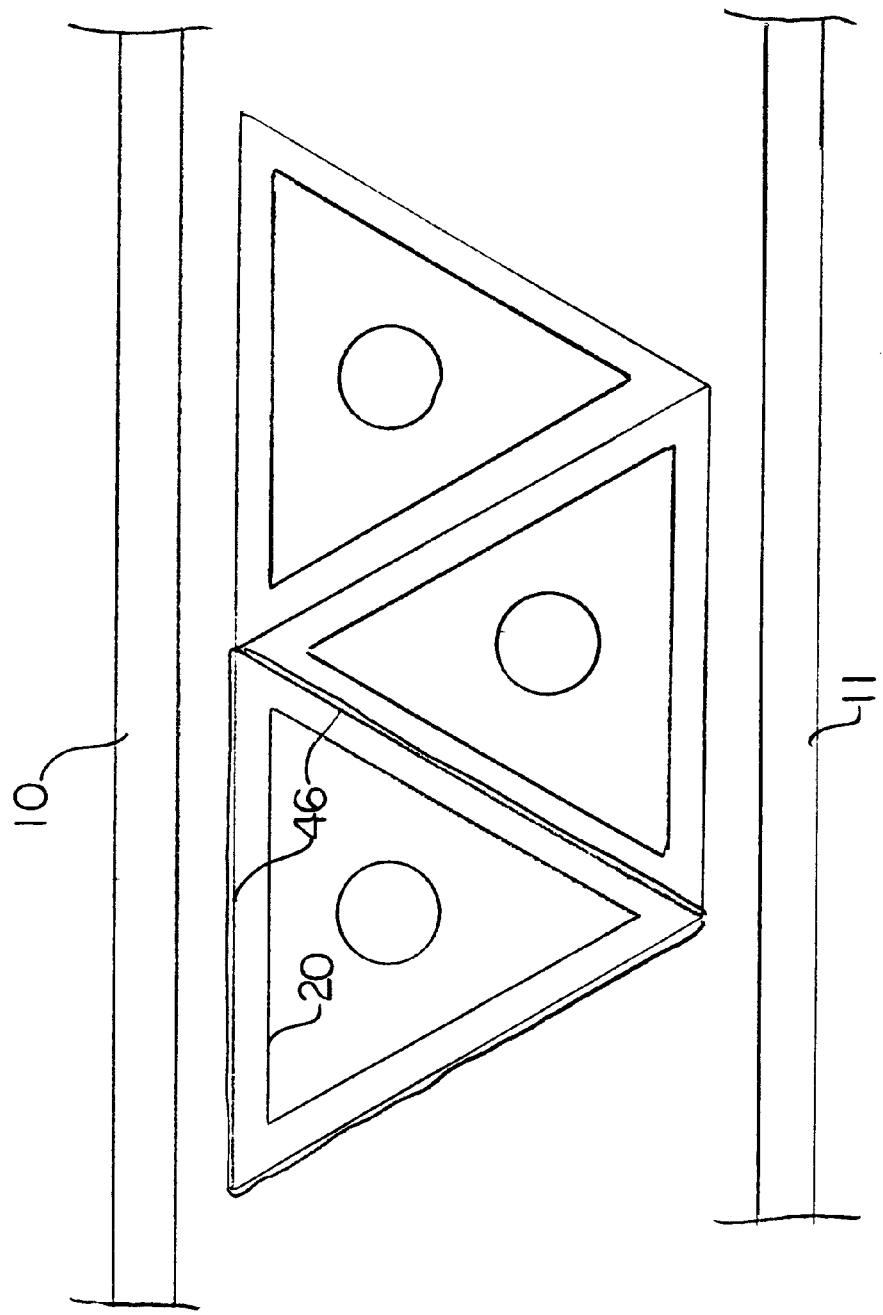
FIG. 8 is a cross sectional view similar to that of FIG. 1 showing a step in the manufacture of the panel.

In one method of manufacturing the individual panels from assembling the connecting members together with the top and bottom sheets, the connecting members are formed as described above on the cores while the filaments carry resin supplied to the filaments by a supply system schematically indicated at 45. Thus the filaments are wetted by suitable quantity of resin which is then carried onto the core so that each of the filaments is surrounded by the resin and embedded in the resin. This leaves a resin rich layer around the outside of the wound tubular layer. Three of the individual connecting members are shown in FIG. 8 where a resin rich layer 46 surrounds the tubular layer 20. The individual connecting members are then pressed together so that the resin rich layer of each contacts the resin rich layer of the next and the resin layers are squeezed together so as to integrate the resin material and intermingle the filaments while the resin material remains un-set. Suitable resin material can be selected which provides a setting time convenient to allow the manufacture of the required number of connecting members and for these members to be connected together into a panel structure prior to the setting occurring. Alternatively the resin can be thermo-setting so that it is set by the application of heat to the completed structure after the parts are assembled. Thus using either of these techniques the resin material of one connecting member is integrated with and connected to the resin material of the next so that the structure becomes integral by the resin being interconnected between the connecting members and holding them together. Also the fibers tend to intermingle thus providing a yet further increase in connection.

The fact that the outside surfaces of the connecting members are formed in flat condition by the above described technique ensures that the interconnecting resin layer is not excessively thick leading to potential breakdown when loads are applied.

Filament winding inherently leads to a relatively rough outside surface and therefore the fact that the connecting members are brought together while the resin is un-set, or the resin is infused after collation of the parts, allows pressure to press the filaments together thus reducing the spaces between the filaments of one member and those of the next and causing some intermingling of the filaments ensuring that the resin layer between the filaments is relatively thin. The fibers also tend to intermingle from the pressure so as to further improve the bonding effect.

Where the top and bottom layers are pre-formed and pre-set, the structure including the connecting members when assembled is then completed by application of the top and bottom layers 10 and 11. These are brought up against the connecting members while the resin in the connecting members remains un-set so that pressure applied to the top and bottom surface of the connecting members can ensure that the resin layer is relatively thin and the bonding effect is sufficient to accommodate the necessary forces between the sheets and the connecting members.

In an alternative arrangement the sheets can be applied while still in wet or un-set conditions so that there is again integration between the resin of the sheets with the resin of the connecting members to provide an integral structure.

Figure 9:
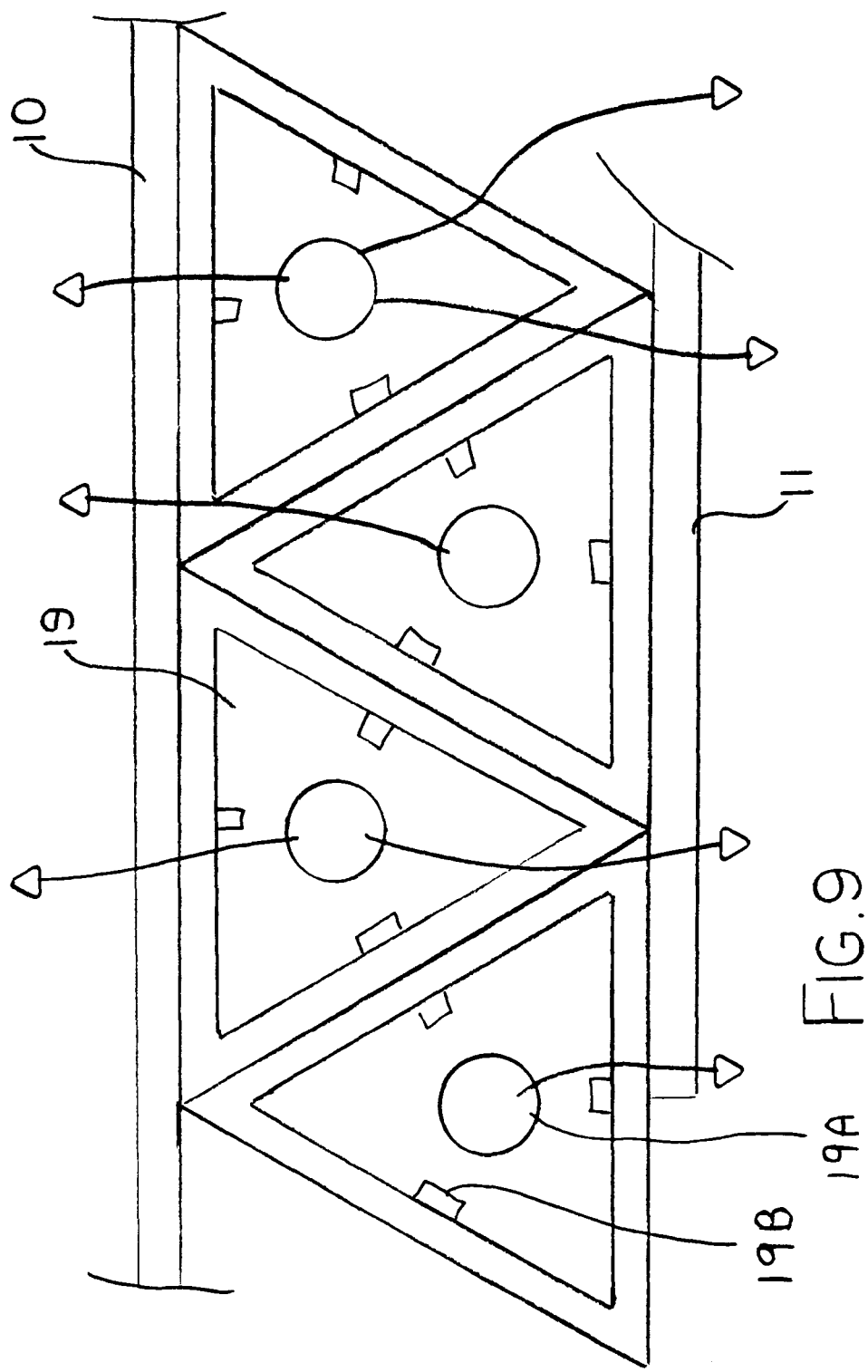
FIG. 9 is a cross sectional view similar to that of FIG. 1 showing an alternative step in the manufacture of the panel.

In FIG. 9 is shown an alternative technique for assembling the sheets and the connecting members. In this embodiment the connecting members are formed so that the filaments are dry and do not carry the necessary resin. The sheets 10 and 11 are also formed in dry condition so that again there is no resin. When assembled and held in a supporting jig, resin is drawn through the assembled structure to pass through the hollow areas 19A inside the cores 19 and channels 19B along the outside of the cores 19 to be drawn into and through the filaments of the connecting members and the filaments of the sheets by an infusion process.

Vacuum and/or pressure infusion of dry filament structures of this type is a known technique well known to one skilled in the art and patents and literature on the subject are readily available providing details of the operation. Using this technique an integral resin structure is drawn through the filaments so that the complete structure is integrated by the resin and commingled filaments.

The above techniques therefore provide a filament wound structure which utilizes inexpensive continuous filament and yet allows the integration of the resin and fibers of the structure into an intimately bonded arrangement suitable to transmit the forces between the individual elements. At the same time the manufacture of the connecting members by filament winding allows the fibers to be positioned in a manner which enhances or maximizes the strength of the structure in the positions that are required so as to minimize the amount of material required.

The complex web structure between first and second layers is comprised of a series of pre-formed resin and fiber pre-forms wherein a foam core material is wrapped with fibers and thermosetting resin several of which are stacked in their uncured form onto the first (top) layer of fibers and resin and upon which the second (bottom) layer of fibers and resin are placed such that the foam core material extends longitudinally of the panel.

The resin impregnated fibers on the foam cored fiber pre-form's exterior co-mingle with similar fibers and resin on their adjacent respective similar fiber pre-forms and on their top and bottom the resin wets out and mingles with the adjacent materials (top and bottom of the panel) forming a materials lay up of substantially uncured fibers and resin to which then a compressive force is applied to more fully consolidate the materials which are then allowed to cure while under such pressure into a unitary panel.

The finished panel therefore is substantially a unitary structure where the foam cored pre-forms of material in particular have co-mingled fibers that are cured together to the other foam cored pre-forms on their sides and similarly the fibers and resin of the foam cored pre-forms both make intimate contact with the top and bottom layer of fibers and resin such that the mating pre-forms resins cure integrally throughout the foam filled web structure of the panel and to the top and bottom pre-formed materials also.

This technique also overcomes the inherent exterior surface irregularities and roughness of cured filament wound structures which impedes bonding to other materials. The intermingling of fibers and the curing of a single resin system throughout the final part yields panels with considerably higher interlaminar shear strengths. Individual components that are glued together (current state of the art) run the risk of failures within the glue line between the individual components of the glued structure.

Figure 10:
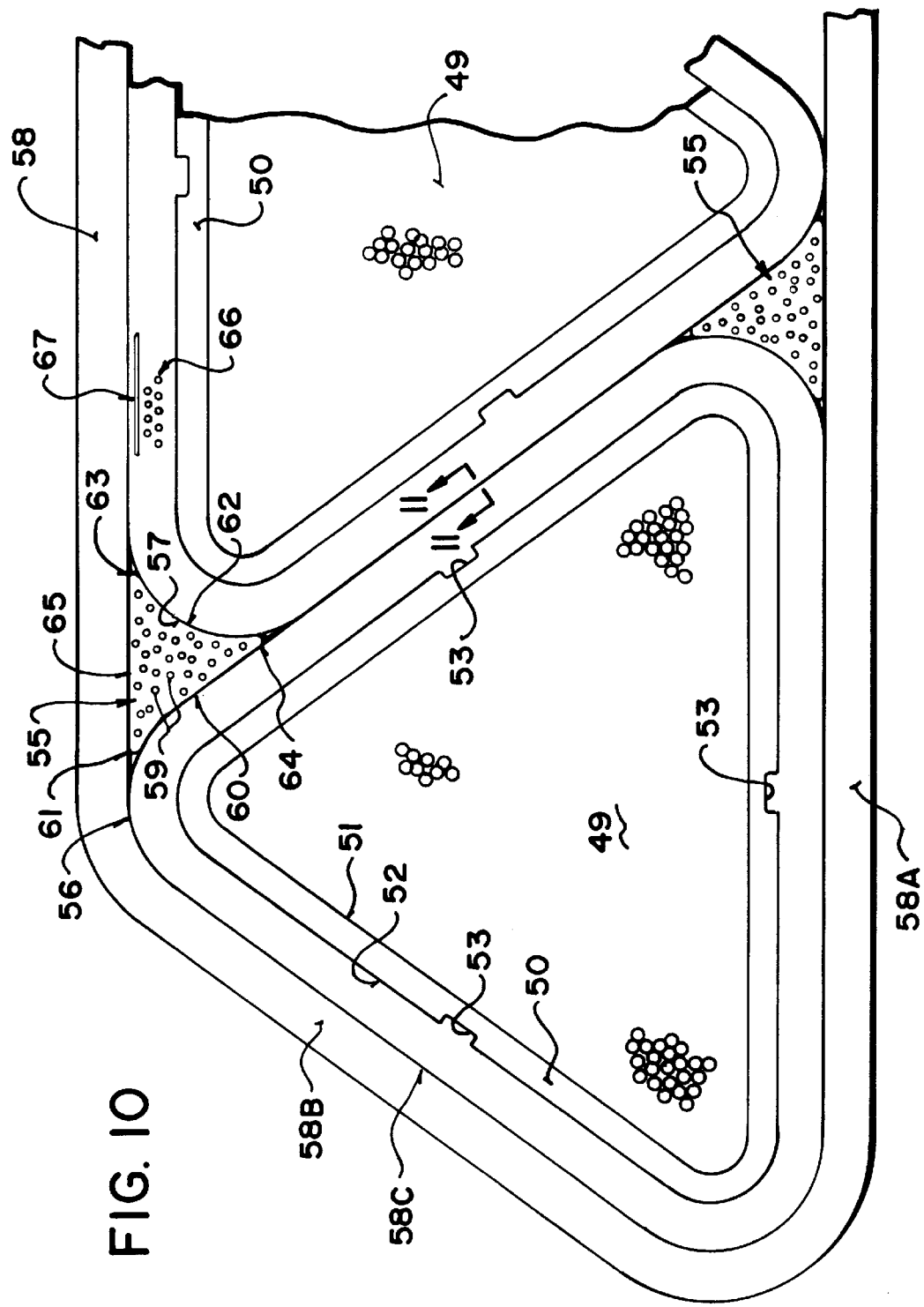
FIG. 10 is a cross sectional view similar to that of FIG. 1 showing an alternative construction of the panel.
Figure 11:
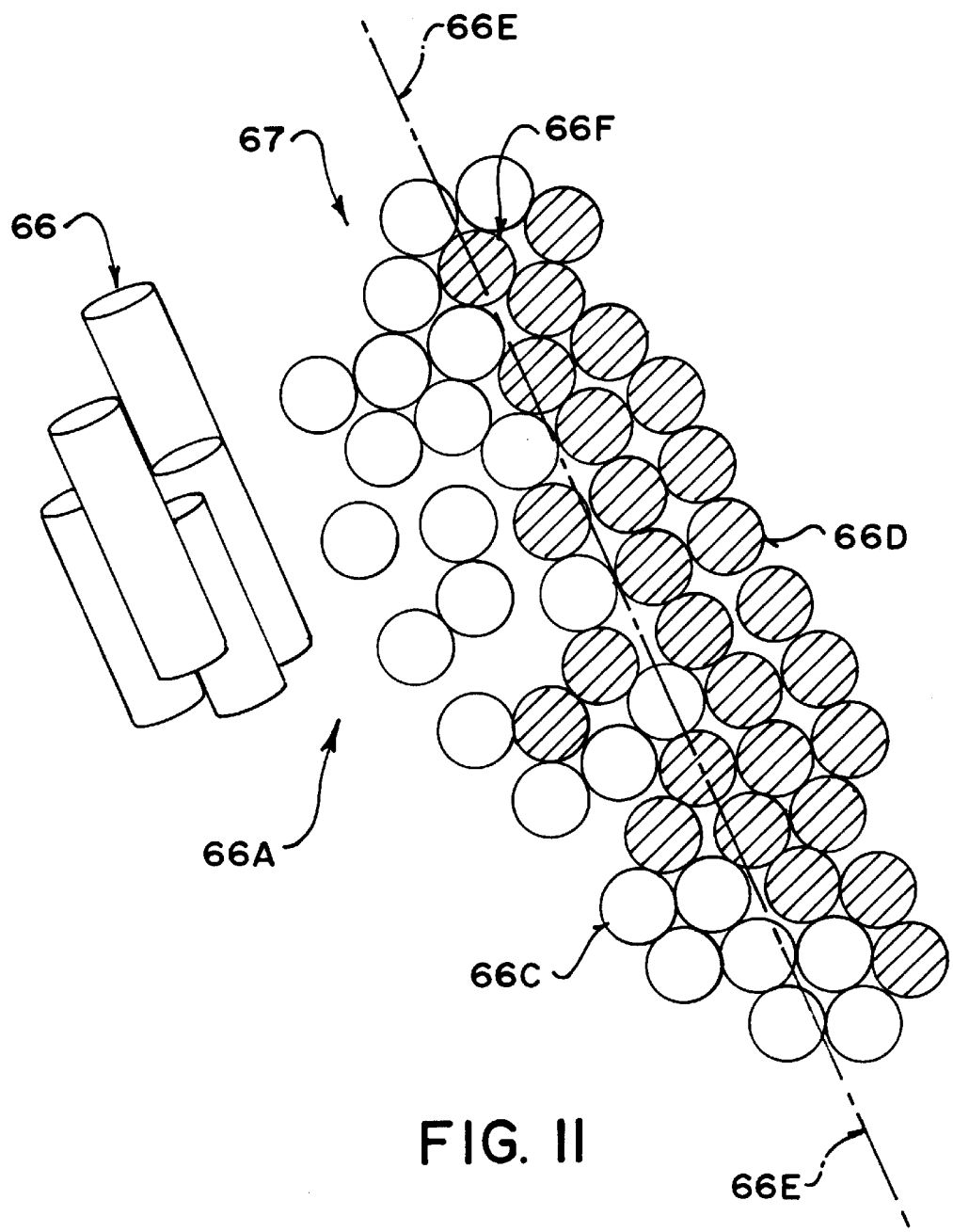
FIG. 11 is a cross sectional view along the line 11 of FIG. 10 on an enlarged scale showing the interaction between the members.

In FIGS. 10 and 11 is shown a further embodiment which includes a number of modifications and improvements relative to the construction previously described. The embodiment of FIG. 10 may also include the particular arrangements as previously described and in FIG. 10 is only shown the modifications which are over and beyond the construction previously described. A number of modifications are presented therefore as follows.

In a first modification the core on which the tubular members are filament wound is provided by a central foam core section 49 on which is applied an initial wrapping 50 of a layer of fiber reinforced resin material arranged to provide sufficient stiffness for the core to accept the pressures from the filament winding process. Alternatively, the core can be formed wholly of a pre-set pultruded tubular core which may be hollow or it may subsequently be filled with the foam material to form the same structure as described above. Pultrusion is a well known technique to one skilled in the art and involves forming fibrous materials into a structure surrounding a mandrel following which the material is pulled through a die while carrying a settable resin material so as to form a relatively thin wall having an inside surface 51 and an outside surface 52. The structural strength of the member need only be sufficient to support the filament winding process without collapsing. As previously described each core member is wound with the filament structures as previously described.

In a second modification, the core member is modified by the addition of a plurality of longitudinally extending channels 53. Each channel extends along the full length of the core and is provided on a respective one of the faces of the core so that each face has at least one channel. More than one channel can be provided on each face. The channels are formed by any suitable technique such as by cutting with a router or by moulding the channels in place.

The channels are used in a method of formation of the panel in which the filament winding is effected in a dry condition without the necessary settable resin and subsequently the resin is drawn into the structure by infusion that is by applying vacuum to the structure to draw the resin along the channels and into the fibers along the full length of the channels. Resin infusion is a known technique and the details of this technique will be well known to one skilled in the art so that further detail is not necessary here.

A further modification is provided by the addition of insert members 55 which are located at the interconnection between apexes 56 and 57 of the connecting members. It will be appreciated that the filament winding around the core necessarily provides a relatively large radius of curvature at the apexes 56 and 57. This curvature therefore leaves a substantially triangular area inside the adjacent sheet 58 and between the apexes 56 and 57. The insert or filler member 55 is formed by pultrusion from longitudinally extending fibers 59 and a settable resin material. In most cases the insert member is set prior to placement between the apexes 56 and 57. The generally triangular shape of the insert 55 thus defines a surface 60 which is slightly curved adjacent one apex 61 so as to follow the curvature of the apex 56. A second surface 62 between apexes 63 and 64 is more sharply curved since it follows closely the whole of the outside curvature of the apex 57. The surface 65 between the apexes 61 and 63 is substantially flat since this abuts the inside surface of the sheet 58. However the insert member may be simply triangular and not have the fine curvatures set forth above since it merely needs to provide a filler for the area between the apexes to reduce the amount of resin in this area and to provide increased structural strength by increasing the proportion of fibers in the structure.

A yet further modification is shown schematically in FIG. 11 in that a first part of the filament winding around the core 50 is effected at a relatively large wind angle indicated schematically at 66 so that the filaments are at a relatively large angle to the specific cross section. The main bulk 66A of the connecting member is thus formed of the relatively large angle filament winding structure as previously described where the wind angle may vary at different points along the length of the structure. A final layer of the filament wound layer is formed as indicated at 67 by filaments which are wrapped at a shallow wrapping angle, the angle only sufficient to ensure that the winding moves along the structure sufficiently to prevent overlap of one layer over the next. Thus if a strip of for example 4 inches of filaments is wrapped simultaneously, the winding angle is sufficient to move the winding over that distance of 4 inches for each turn of the structure. This arrangement therefore finishes the structure with a generally spiral wrapping at a low wind angle. This achieves the first effect of consolidating the main body 66A to remove air spaces and to avoid resin rich areas. Secondly, as shown in FIG. 11, the filaments at the intersection between the two members are both at right angles to the respective axis and thus are generally parallel. Thus FIG. 11 show the filaments of one member 66C as hollow circles while those of the other member 66D are shown crosshatched. The nominal outermost peripheral surface of the member 66C is shown at the dash line 66E. it will be appreciated therefore that some of the filaments intermingle by crossing over the line 66E into the interstices between the filaments of the other member. This acts to smooth out any lumps or ridges in the filament structure to ensure a close approach of the members to reduce the thickness of the resin layer. It also acts to increase the amount of surface contact or close approach between the filaments so that for example the filament shown at 66F is contacted or close to three filaments from the other member which thus dramatically increase the bonding forces between the two members over what they would be with merely tangential contact along the line 66E.

The high wind angle used for the majority 66A of the structure provides a high level of interaction between the fibers since the filaments from one turn are crossing at a relatively high angle relative to the filaments from the next turn in the opposite direction of movement of the winding head. In addition, the total thickness is built up by a large number of longitudinal traverses so as to form an overlapping weave effect which significantly increases the number of other crossing fibers contacted by each fiber so that each is supported in its position by all of those fibers and thus is more stable. Thus each fiber or filament contacts a large number of other filaments in the structure and the interconnection by way of the resin ensures transmission of loads between the filament to increase the structural strength of the product.

A yet further modification in the arrangement shown in FIG. 10 is that the sheets 58 and 58A are formed not as separately applied flat sheets but as a filament wound structure which is wrapped around the combined connection at members. Thus the connection members are arranged side by side in a suitable holding jig so that the required number are arranged in a row leaving one side surface of one member exposed at one end of the row and another side surface of another of the members exposed at the other end of the row. The whole structure is then wrapped using filament winding so that the top and bottom sheets 58 and 58A are formed by top and bottom portions of the filament wrapping and the exposed side surfaces are over-covered by another layer formed by the filament wrapping. Thus a portion 58B of the filament wrapping overlies an outside surface 58C of the endmost connection member in the row to provide increased transverse strength between the sheets. This arrangement does not however provide the projecting flange portions shown in FIGS. 1 and 9 for interconnection of each panel to the next but the interconnection can be carried out using the techniques described in more detail hereinafter.

Alternatively, the top and bottom sheets can be formed by filament winding around a hollow rectangular box and each sheet cut from one side of the box, carried into place and laid onto the respective surface of the assembled connecting members. Filament winding at a relatively large wind angle automatically provides the filaments at inclined angles in both directions without the necessity for two or more overlying layers to form the sheets.

As previously described the resin can be applied during the filament winding. The connecting members are brought together while dry and the resin applied subsequently or are brought together while wet and the resin un-set. The connecting members can also be assembled with the resin partly cured or at a B stage. In any event the resin is caused to cure or for curing to be completed while the structure is assembled so that the connecting members are in abutting relationship and the filament winding is applied. This ensures that there is provided an intermingling of the fibers and the resin from the different structures to ensure an integration of the structure which provides the necessary total strength.

Figure 12:
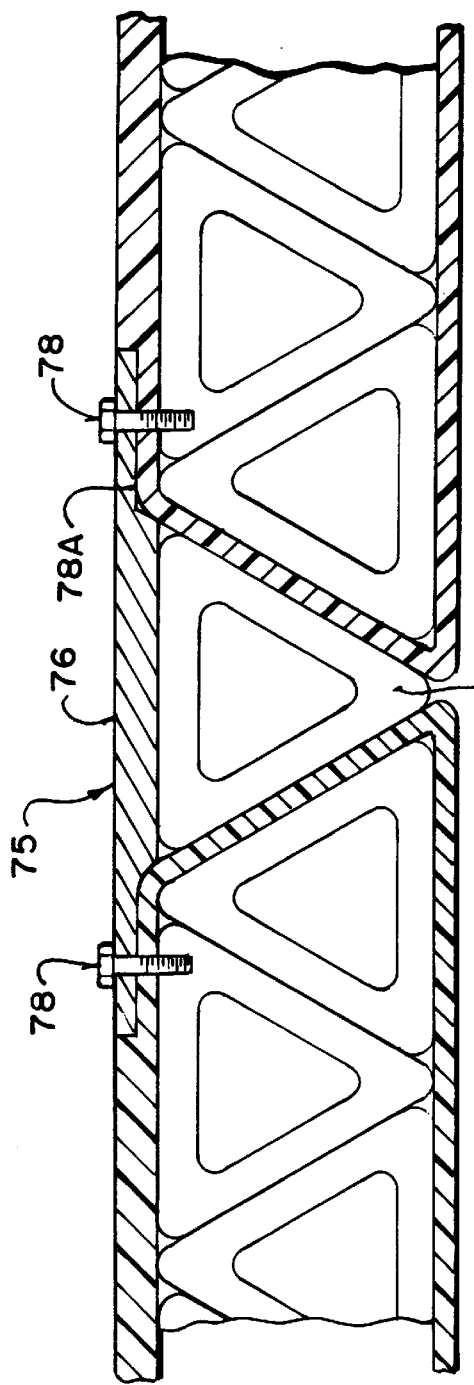
FIGS. 12 and 13 show two arrangements for connection of one panel to a next adjacent panel.
Figure 13:
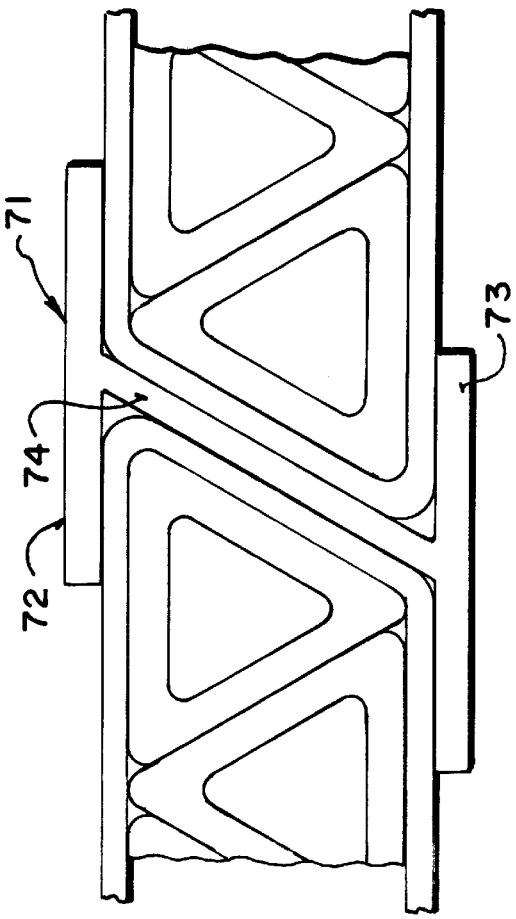

Turning now to FIGS. 12 and 13, there are shown a number of different connection techniques by which the panels can be connected together side edge to side edge.

In FIG. 13, the panels are of the type shown in FIG. 10 wherein there is no extending face plate and in this arrangement there is provided a pultruded I-shaped member 71 with top and bottom flanges 72, 73 engaging the top and bottom faces respectively of the panels, and these can be bolted to the top and bottom sheets if required or attached by adhesive. The web 74 of the I-shaped member 71 is inclined to follow the face of the outermost connecting member so that it lies at an angle of 60° to the flange.

In FIG. 12 is shown an arrangement wherein there is formed a specific key element 75 including a flat face plate 76 which is attached to one of the triangular connecting members 77 and this is dropped into the space between two end connecting members of two panels and the top face plate 76 attached to the top surface of the panels. The key can be attached by adhesive so as to communicate forces between the panels and particularly between the flat plate 76 of the key and through the connecting member 77 of the key to the top plate of the panels. The key can be bolted through the plate 76 by bolts 78 into the top sheet of the panels. Also the top plate 76 can be recessed into cut out recesses 78 of the top sheets. The key can also be inserted from the underside into the bottom sheets in symmetrical manner and the face plate is bolted by blind fasteners or fastened by the recess or adhesive technique.

In a further arrangement (not shown) the side faces of the outermost connecting members are interconnected by dowels at spaced positions along the length of the panels and extending parallel to the top and bottom sheets and at right angles to the length of the panels. The dowels thus transfer loads through the end faces of the panels.

In another arrangement (not shown) the panels are connected using an additional molded element which is inserted between two of the panels and acts as a shear key.

Figure 14:
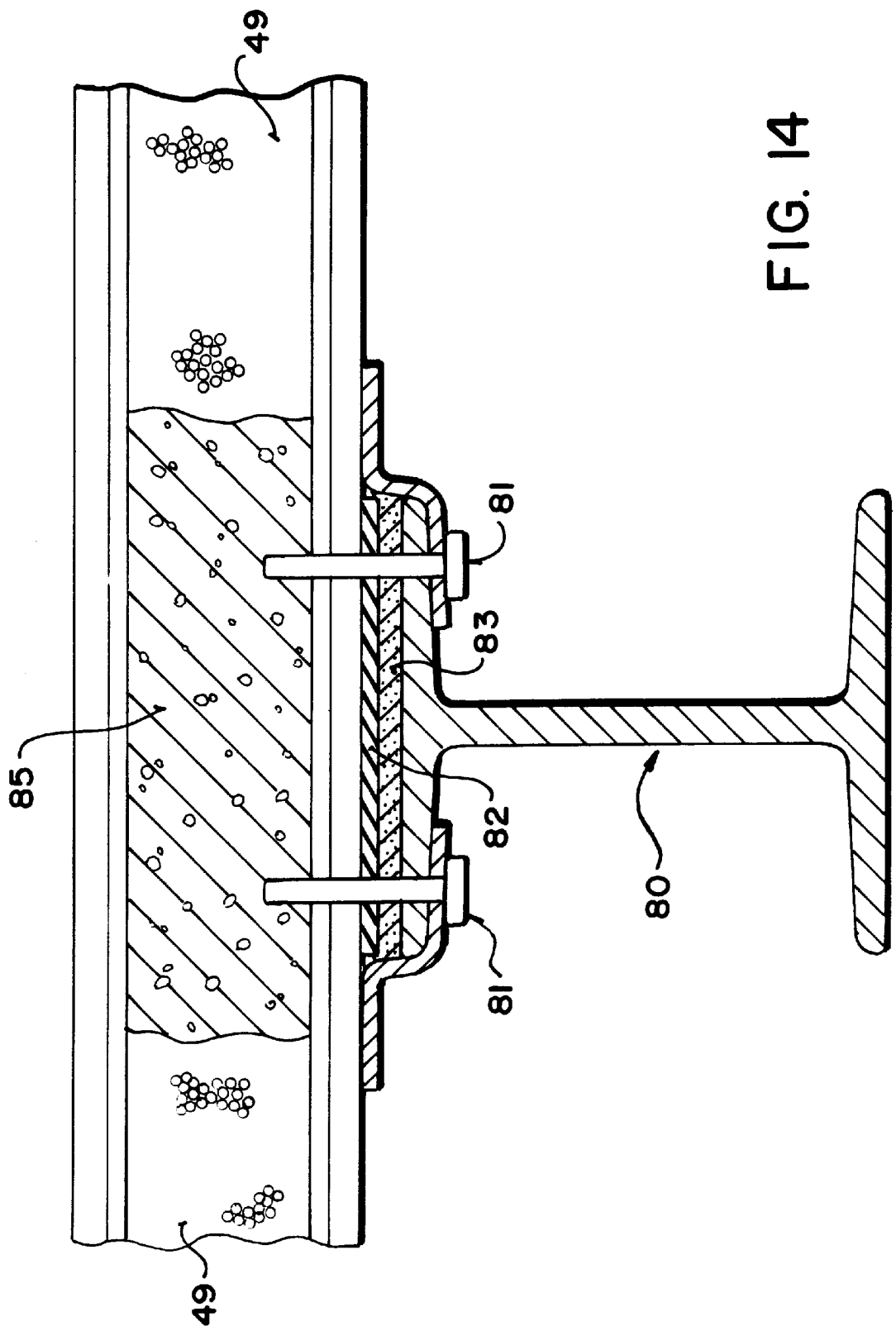
FIG. 14 shows an arrangement for mounting the panels on a supporting girders of a bridge structure.

In FIG. 14 the deck panels of the bridge deck are supported by girders 80 that are connected to the panels using blind fasteners 81 for steel or FRP girders or using shear dowels in case of concrete girders. A neoprene or similar flexible bearing pad 82 is located on top of the flange of the girder for engaging the underside of the panel. A layer 83 of an injected concrete or other material is provided on top of the girder and underneath the pad to make up the camber, that is the difference in height between the top of the girder and the bottom of the panel which is due to the conventional arrangement in which the girders are bowed in manufacture whereas the panels are straight. An injected plug 85 of concrete or similar material is inserted into the hollow interior of the connecting members at the girder to improve the force transfer at the connection. The foam core can be dissolved out to allow the injection of the concrete and the fasteners 81 engaged into the concrete as shown.

In an alternative arrangement (not shown) a triangular key member is mounted on the top flange of the girder and extends between two ends of adjacent panels. The key is used in cases where the blind fasteners or dowels cannot be used.

Figure 15:
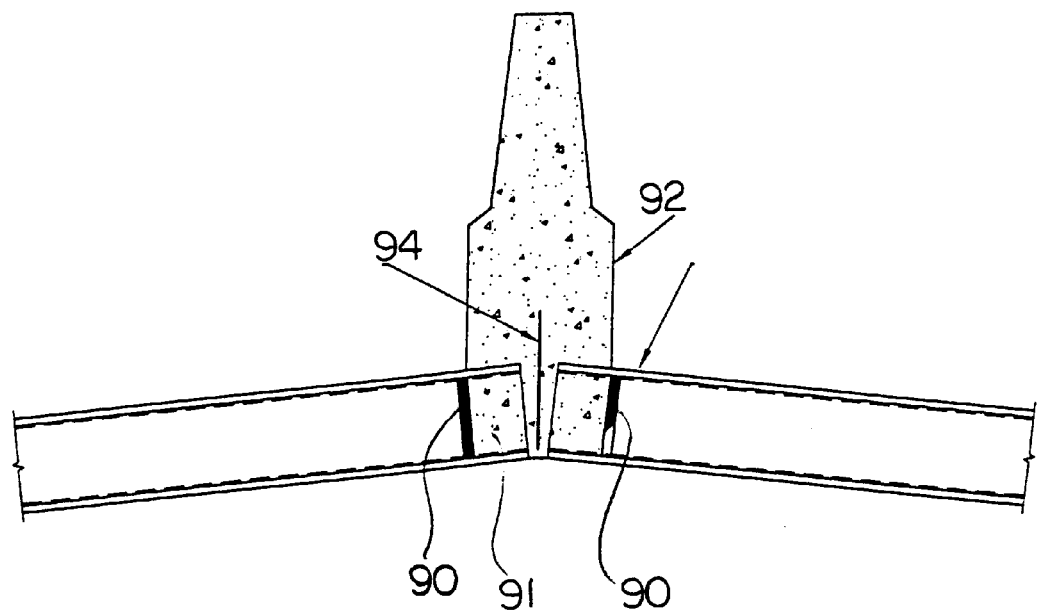
FIG. 15 shows an arrangement for providing a central interconnection and barricade between two panels at center line of a roadway.

Turning now to FIG. 15, there is shown an arrangement for connecting two panels at a center line of a roadway in order to provide a slope of each panel away from the center line suitable for the roadway. The typical roadway has a transverse crown slope of a maximum of 6%. The crown is achieved in the deck arrangement where two panels join at the center line 94 by the arrangement shown. Two deck panels are connected at the crown using a plug 90 in the end of each panel up to the removed foam core with injected polymer grout 91 up to the plug. A central concrete median or barrier wall 92 is cast in place and a portion of the cast material engages into the ends of the panels through the open face of the tubular connecting members to tie the concrete median to the panels.

In an alternative arrangement (not shown) the connection between the two modules is effected using a filament wound shell filled with polymer grout.

Figure 16:
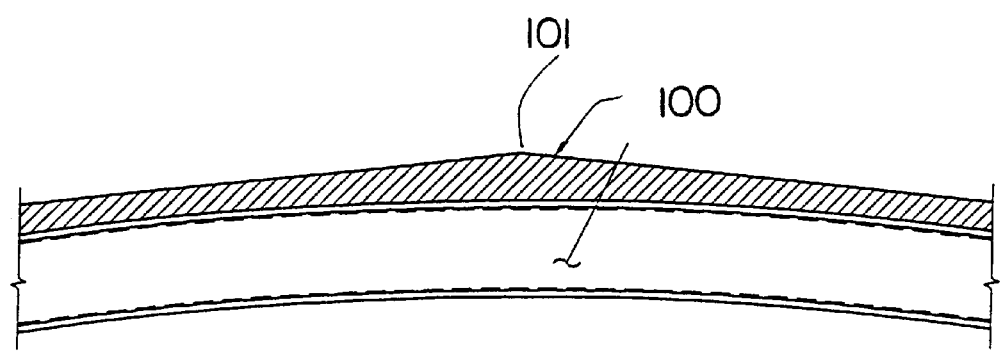
FIG. 16 shows an arrangement for providing a wearing surface on a single panel.

In FIG. 16, there is shown an arrangement for providing a wearing surface having the necessary crown in which the road surface is provided on the panels without the necessity for two panels abutting at a center line. Such an arrangement is used where the roadway is relatively narrow so that a single panel spans the full width of the bridge. In this arrangement there is provided a wearing surface 100 which is shaped to provide the crown to an apex 101 and the necessary 6% slope diverging outwardly from the central apex 101 at the center of the roadway.

The panels are formed in a manner which allows them to be curved with a slight curvature so that the center of the panels is raised above the two ends by a relatively small amount providing a slope less than the maximum 6%. The central apex 101 is then formed in the wearing surface provided on top of the panels.

Figure 17:
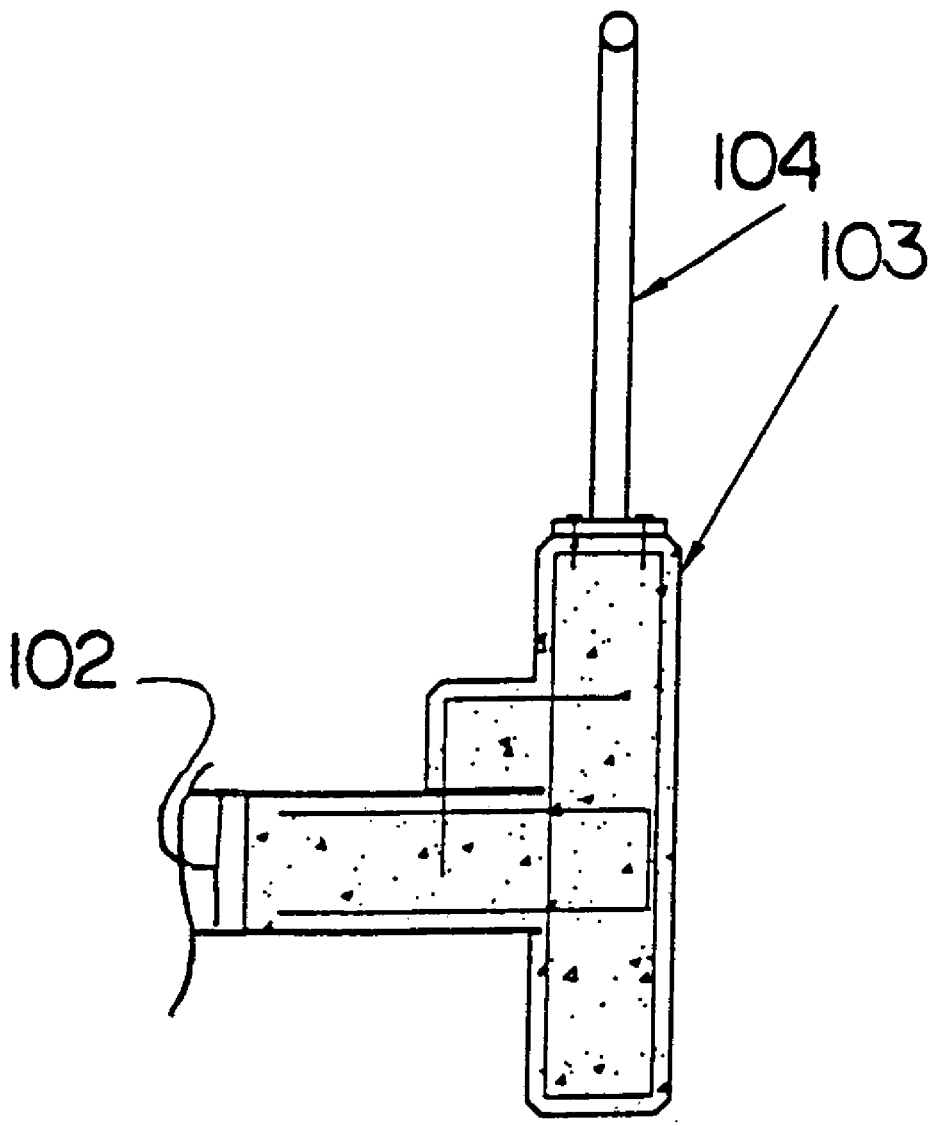
FIG. 17 is a vertical cross sectional view through one end of a panel showing attachment of the panel to a cast concrete curbing.

In FIG. 17 is shown an arrangement for providing a concrete curbing at the edge of the panels at one side of the roadway. In this arrangement a cast concrete curbing 103 is formed having a portion thereof cast into the end face of the connecting members up to the plug 102 so that the cast concrete curbing is bound to or connected to the panels by the portion thereof cast into the panels. A suitable shaping of the concrete curbing is provided with a top surface for receiving a metal guard rail 104 as required.

Figure 18:
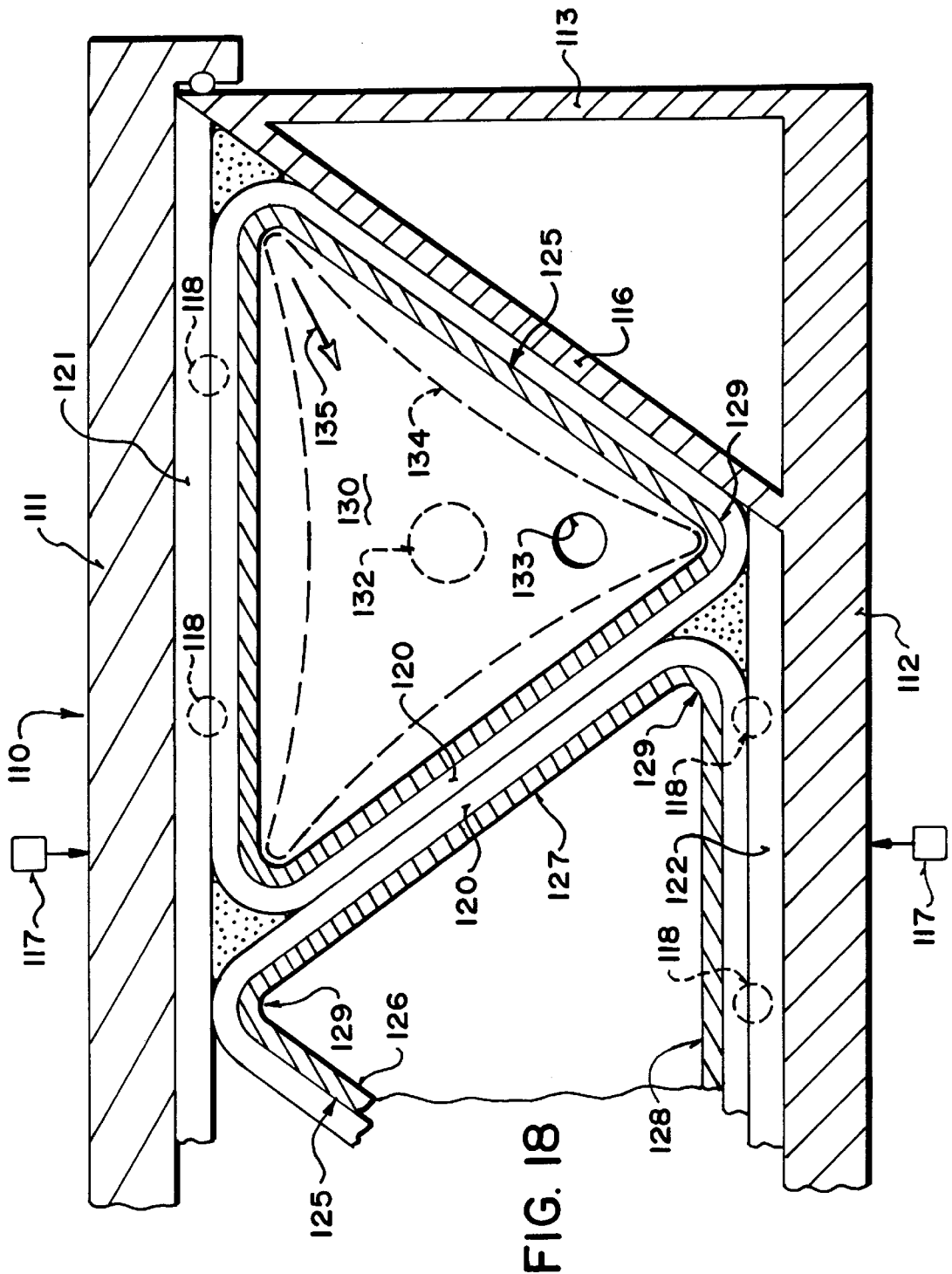
FIG. 18 is a cross section similar to that of FIG. 10 showing a further embodiment using a surrounding mold, pressure infusion of resin and the use of a removable mandrel as the core on which the filament winding is effected.
Figure 19:
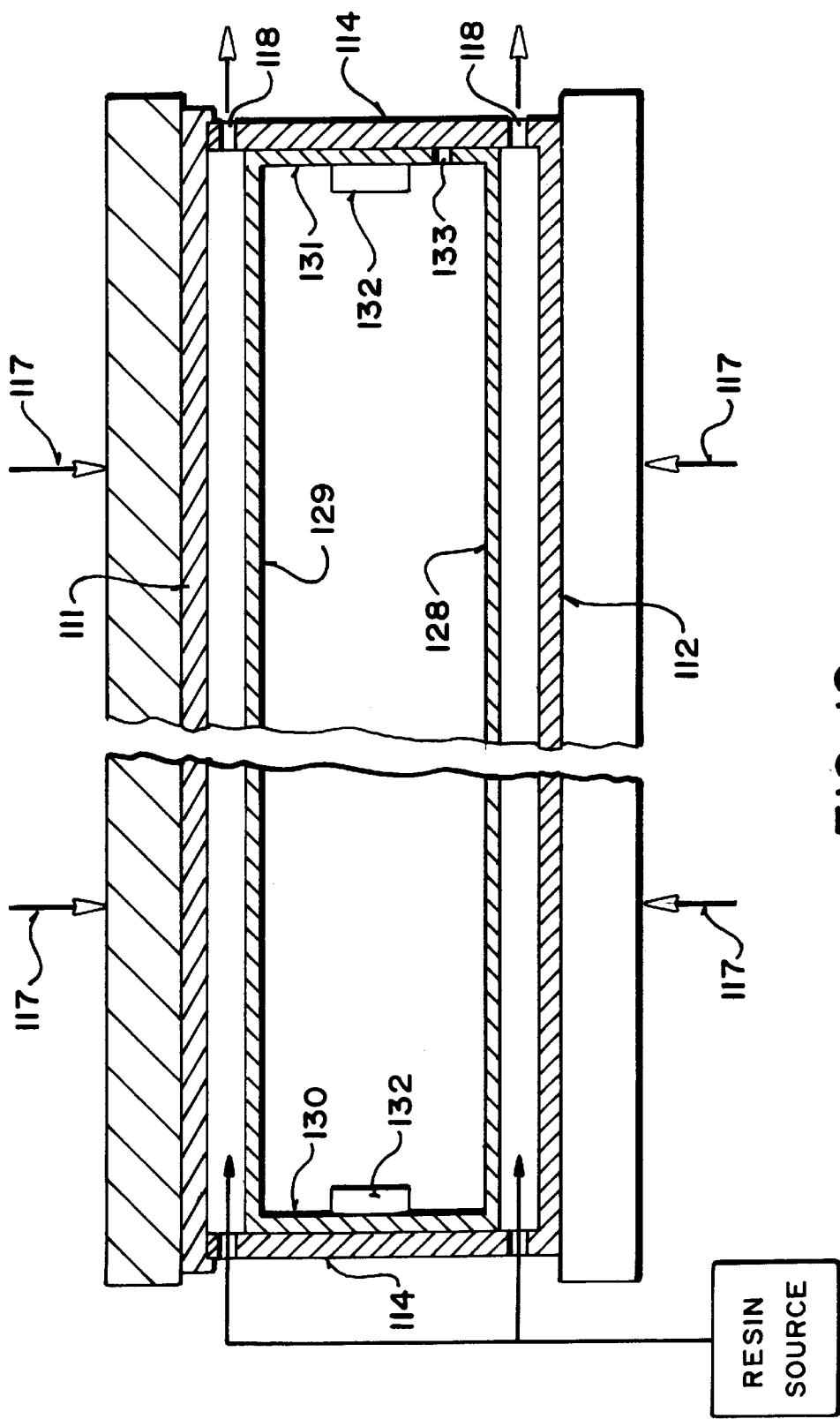
FIG. 19 is a cross section at right angles to that of FIG. 18 showing the resin injection under pressure.

Turning now to FIGS. 18 and 19, there is shown a modified embodiment basically using the principles of FIG. 10 in which the following modifications are included.

Firstly the connecting members and the top and bottom sheets are inserted into a hollow mold 1 10 having a top wall 111, a bottom wall 112, side walls 113 and end walls 114. The mold has a top section defined by the top wall and a down turned lip sealed by an O ring relative to a bottom portion defined by the bottom wall, side walls and end walls, thus allowing the top section to be opened to allow the elements to be inserted and removed. Other suitable mounting and sealing arrangements well known to one skilled in the art can be provided in the mold to allow the mold to be opened and to maintain the mold effectively sealed when closed.

The mold is compressed by a suitable compression system schematically indicated at 117 which maintain the mold closed during the molding process against internal mold pressures.

Molding is effected by injecting resins from a suitable resin source under pressure through one end of the mold so that the resin flows along the mold ejecting air from the opposed end of the mold through discharge openings 118. Suitable pressure can be provided by a pressure pump to ensure that the resin infuses through the whole fiberous structure with few if any voids or dry spots. Resin injection from different points in the mold can be provided as required, as will be apparent to one skilled in the art. The infusion can be further enhanced by the application of vacuum to the outlets 118 since this acts to pre-extract air to allow better flow of the resin and acts to reduce any voids since the release of vacuum before setting of the resin causes the voids to collapse under external air pressure.

Secondly the molded structure is formed from the connection members 120 as previously described together with a top and bottom sheets 121 and 122 respectively. Instead of the sheets being formed by a filament wound wrapping extending around the full periphery, in this case the top and bottom sheets are formed by individual sheet sections laid over the top and bottom of the connecting members respectively. Such sheets can be formed, as previously described from filament wound structures removed from a support core and draped over the top and bottom of the structure defined by the connecting members. The bottom part of the mold is shaped to receive and match the required shape of the panel defined by the connecting members and the top and bottom sheets. In the arrangement shown, therefore, the bottom mold part includes an inclined side wall 116 matching the side wall of the side connecting member.

Resin infusion is then effected by the pressure and vacuum system described above so that the resin passes through the complete structure flowing from one end of the structure to the other end of the structure.

Thirdly the sacrificial cores previously described are replaced by removable hollow metal tubes 125 on which the filament wound connecting members are formed. Thus each core or mandrel is defined by three walls 126, 127 and 128 connecting together at apexes 129. The walls are formed from steel or other suitable material so as to have sufficient rigidity to accommodate the forces applied during the winding action. The core is hollow. It is closed at its ends by end walls 130 and 131. The end walls define a bracket 132 by which the mandrel can be mounted upon a rotary drive assembly for rotation about a longitudinal axis of the mandrel during the winding action.

After the process is complete, the core or mandrel is removed from the interior of the connecting member. This removal is effected by applying a vacuum to the closed hollow interior of the core through an opening 133 in one end wall so that the external air pressure on the walls causes the walls to bow inwardly from their initial straight line condition between the apexes so that each wall is curved inwardly to take up a curved line indicated at 134. Thus the wall is pulled away from the interior surface of the wound tubular structure. Also the distortion of the walls causes the apexes to pull inwardly as indicated at 135. The amount of movement of the walls and apexes of the core is relatively small and is effected without collapsing or damaging the structure. As the walls require sufficient strength to accommodate the winding forces, the walls have to be sufficiently thick and rigid to provide that necessary strength and hence the amount of distortion available under readily available vacuum provides only a relatively small amount of movement particularly at the apexes but this is sufficient to allow the core to be pulled longitudinally relative to the wound tubular member. In addition the application of forces to the connecting member during pulling by an abutment at one end of the structure causes the tubular member to slightly expand, due to the angle of the filaments, as it is compressed in the longitudinal direction by its engagement with the abutment. These two opposing actions of the expansion of the tube member and the contraction of the core allow the core to be pulled longitudinally and removed from the finished panel. Each core in turn is removed allowing the structure to be formed substantially wholly by the filament wound materials and for the cores to be reused in a subsequent process thus minimizing the material cost.

Since various modifications can be made in my invention as herein above described, and many apparently widely different embodiments of same made within the spirit and scope, it is intended that all matter contained in the accompanying specification shall be interpreted as illustrative only and not in a limiting sense.

What is claimed is:

1. A method for forming a structural panel for bridging between longitudinally spaced supports comprising:
    collating a structure comprising:
        a first sheet of fibers;
        a second sheet of fibers generally parallel to and spaced from the first sheet;
        and a plurality of intervening connecting members for arrangement between and connection to the first and second sheets, the connecting members being parallel, side by side and extending longitudinally of the panel;
    wherein each connecting member is formed from an outer tubular layer defined by a series of helically wrapped filaments;
    and wherein an unset resin in the filaments of the connecting members is cause to set while the connecting members are in intimate contact each with the next causing the resin and filaments of each connecting member to intermingle with those of the next adjacent member while the resin sets such that the connecting member and the next adjacent connecting member are intimately bonded together by the resin of one being set with the resin of the next and filaments of one being intermingled with filaments of the next.

2. The method according to claim 1 wherein the tubular layer is formed wholly from unidirectional rovings without any fabric.

3. The method according to claim 1 wherein the filaments of each connecting member are wound while dry of the resin and wherein the resin is applied to the connecting members by infusion.

4. The method according to claim 3 wherein the filaments of each connecting member are wound onto a core and wherein the core has at least one longitudinal channel therein to allow transfer of the resin during infusion.

5. The method according to claim 1 wherein each connecting member is formed by winding filaments in an initial winding step at an angle to the axis of the core and wherein in a final step of winding, the filaments are wound at an angle substantially at right angles to the axis so that the filaments of one connecting member are substantially parallel to those of the next when the connecting members are place side by side.

6. The method according to claim 1 wherein un-set resin in the filaments of the first and second sheets is cause to set while the connecting members are in intimate contact therewith.

7. The method according to claim 6 wherein the resin is infused into the collated structure after collation.

8. The method according to claim 6 wherein the first and second sheets are formed by filament winding.

9. The method according to claim 6 wherein the first and second sheets are formed by filament winding around the connecting members when collated into a stack.

10. The method according to claim 1 wherein the connecting members are polygonal such that a flat surface of one lies in contact with a flat surface of the next.

11. The method according to claim 1 wherein the tubular layer is formed by wrapping around a core and wherein the core is formed by a foam core portion having a layer of a fiber reinforced resin material covering the core portion.

12. The method according to claim 1 wherein each of the connecting members comprises a polygon in cross section arranged such that at least one flat surface of each polygonal connecting member engages a flat surface of the next adjacent, each connecting member having the apexes thereof rounded and wherein there is provided a rigid elongate insert member between the apex of one connecting member and an adjacent portion of the next to fill the space therebetween formed by the rounded apex.

13. The method according to claim 12 wherein the insert member includes longitudinally extending reinforcing fibers.

14. The method according to claim 1 wherein the filaments of each connecting member are wrapped around a rigid removable core.

15. The method according to claim 14 wherein the removable core is defined by closed walls defining a hollow interior and is removed after the resin is set by applying a vacuum to the hollow interior of the core so as to flex the walls inwardly so as reduce exterior dimensions of the walls sufficiently to allow removal of the core by pulling the core longitudinally of the connecting member.

16. The method according to claim 1 wherein the connecting members are inserted into a closed mold and the resin is infused into the connecting members by injecting the resin into the mold under pressure.

17. The method according to claim 1 wherein each connecting member has a thickness of the outer tubular layer defined by the helically wrapped filaments which varies along the length of the connecting member and wherein the tubular layer has an inner surface which varies in spacing from a central axis of the connecting member in a direction along the length of the connecting member such that cooperating flat surface portions thereof are flat along the length of the connecting member.

18. The method according to claim 17 wherein the thickness of the outer tubular layer is varied by variations in the wind angle of the helically wound filaments.

19. The method according to claim 18 wherein the wind angle is reduced at the supports and increased at positions midway between the supports.

20. The method according to claim 17 wherein each connecting member includes a core having an outer surface contacting the inner surface of the tubular layer, the outer surface of the core having a shape which is varied along the length of the core so as accommodate the variation in the thickness of the tubular layer.

21. The method according to claim 1 wherein the tubular layer of each connecting member includes a plate of filament reinforced resin material wrapped on the outside by the helically wound filaments.

22. The method according to claim 21 wherein the plate of filament reinforced resin material is formed wholly by rovings extending parallel along the plate.

23. The method according to claim 22 wherein the plate of filament reinforced resin material is formed wholly by rovings extending parallel along the plate and longitudinal to the connecting member.

24. The method according to claim 23 wherein the plate of filament reinforced resin material is located adjacent the midpoint between supports.

25. The method according to claim 24 wherein the plate of filament reinforced resin material reduces in width either side of the midpoint.

26. The method according to claim 22 wherein each connecting member includes a core having an outer surface contacting the inner surface of the tubular layer, the outer surface of the core having a shape recessed along the length of the core so as accommodate the thickness of the plate.

27. The method according to claim 1 wherein the tubular layer of each connecting member has at least one flange projecting inwardly.

28. The method according to claim 27 wherein the flange is formed by filaments wound spirally at a predetermined location along the connecting member.

29. The method according to claim 28 wherein the flange is arranged adjacent a respective one of the supports.

30. The method according to claim 27 wherein each connecting member includes a core having an outer surface contacting the inner surface of the tubular layer, the outer surface of the core having a shape recessed at the flange so as accommodate the depth of the flange.

31. The method according to claim 1 wherein the connecting members are open at least at one end thereof and wherein the method includes attaching an end structure to the end of the end of the panel by casting the end structure and inserting a portion of casting material therefor into the end of the connecting members for connection of the end structure to the panel.

32. The method according to claim 31 wherein the panel comprises a bridge deck and the end structure comprises a barricade defining a side wall of a roadway formed on the bridge deck.

33. The method according to claim 31 wherein the panel comprises one half of a bridge deck for connection end to end at a center line of the bridge deck with a similar panel forming a second half and the end structure comprises a connector for interconnecting the two halves.

* * * * *